United States Patent
Araki et al.

(10) Patent No.: US 9,139,224 B2
(45) Date of Patent: Sep. 22, 2015

(54) INVERTED PENDULUM TYPE VEHICLE

(71) Applicant: HONDA MOTOR CO., LTD., Tokyo (JP)

(72) Inventors: Makoto Araki, Wako (JP); Shinichiro Kobashi, Wako (JP); Shinya Shirokura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/225,564

(22) Filed: Mar. 26, 2014

(65) Prior Publication Data
US 2014/0291044 A1 Oct. 2, 2014

(30) Foreign Application Priority Data

Mar. 29, 2013 (JP) .................. 2013-074050

(51) Int. Cl.
*B62K 11/00* (2006.01)
*B62K 17/00* (2006.01)
*B62D 11/00* (2006.01)
*B62K 3/00* (2006.01)

(52) U.S. Cl.
CPC .............. *B62D 11/001* (2013.01); *B62K 3/007* (2013.01)

(58) Field of Classification Search
CPC .............................. B62K 3/007; B62D 11/001
USPC ......................................................... 180/220
See application file for complete search history.

(56) References Cited

U.S. PATENT DOCUMENTS

| | | |
|---|---|---|
| 8,050,837 B2 | 11/2011 | Yamada |
| 8,353,378 B2 | 1/2013 | Gomi et al. |
| 8,408,339 B2 | 4/2013 | Makino |
| 8,467,922 B2 | 6/2013 | Takenaka |
| 8,467,948 B2 | 6/2013 | Takenaka et al. |
| 8,522,902 B2 | 9/2013 | Gomi et al. |
| 8,583,302 B2 | 11/2013 | Akimoto et al. |
| 8,751,110 B2 | 6/2014 | Takenaka et al. |
| 8,758,191 B2 | 6/2014 | Takenaka et al. |

(Continued)

FOREIGN PATENT DOCUMENTS

DE 20 2007 007 673 U1 10/2007
EP 1 529 556 A2 5/2005

(Continued)

OTHER PUBLICATIONS

U.S. Notice of Allowance, issued Feb. 25, 2015, for U.S Appl. No. 14/273,075.

(Continued)

*Primary Examiner* — Tony Winner
(74) *Attorney, Agent, or Firm* — Birch, Stewart, Kolasch & Birch, LLP

(57) ABSTRACT

An inverted pendulum type vehicle enabled to easily execute a turning motion with a configuration of a low cost. An inverted pendulum type vehicle includes a second moving motion unit disposed with an interval from a first moving motion unit and configured to be capable of moving in all directions on a floor surface. A brake device is configured to be capable of generating a brake force imparted to the second moving motion unit. A control unit is provided for determining the presence/absence of a request for turning motion of the vehicle, and, when there is a request for the turning motion, to control the motion of the brake device so as to impart a braking force to the second moving motion unit.

20 Claims, 10 Drawing Sheets

(56) References Cited

U.S. PATENT DOCUMENTS

| | | |
|---|---|---|
| 2005/0126833 A1 | 6/2005 | Takenaka et al. |
| 2007/0084662 A1 | 4/2007 | Oikawa |
| 2010/0038960 A1 | 2/2010 | Takenaka et al. |
| 2010/0070132 A1 | 3/2010 | Doi |
| 2010/0096905 A1 | 4/2010 | Takenaka et al. |
| 2010/0114421 A1 | 5/2010 | Doi |
| 2010/0299044 A1 | 11/2010 | Miyake et al. |
| 2011/0060518 A1 | 3/2011 | Kosaka |
| 2011/0067936 A1 | 3/2011 | Takenaka et al. |
| 2011/0071714 A1 | 3/2011 | Takenaka |
| 2011/0071752 A1 | 3/2011 | Takenaka et al. |
| 2011/0209932 A1 | 9/2011 | Takenaka et al. |
| 2012/0166048 A1 | 6/2012 | Inoue et al. |
| 2012/0173042 A1 | 7/2012 | Takenaka et al. |
| 2012/0173086 A1 | 7/2012 | Takenaka et al. |
| 2012/0217072 A1 | 8/2012 | Hoffmann et al. |

FOREIGN PATENT DOCUMENTS

| | | |
|---|---|---|
| EP | 1 632 428 A1 | 3/2006 |
| EP | 2 045 180 A1 | 4/2009 |
| EP | 2 052 924 A1 | 4/2009 |
| EP | 2 163 467 A1 | 3/2010 |
| EP | 2 319 750 A1 | 5/2011 |
| JP | 2004/129435 A | 4/2004 |
| JP | 4181113 B2 | 11/2008 |
| JP | 2010-167807 A | 8/2010 |
| JP | 2010-167808 A | 8/2010 |
| JP | 2011-63183 A | 3/2011 |
| JP | 2011/063183 A | 3/2011 |
| JP | 2011-63241 A | 3/2011 |
| JP | 2011-63243 A | 3/2011 |
| JP | 2011-68222 A | 4/2011 |
| WO | WO 02/30730 A2 | 4/2002 |
| WO | WO 2008/132778 A1 | 11/2008 |
| WO | WO 2008/132779 A1 | 11/2008 |
| WO | WO 2010/113439 A1 | 10/2010 |
| WO | WO 2011/033575 A1 | 3/2011 |
| WO | WO 2012/017335 A1 | 2/2012 |

OTHER PUBLICATIONS

U.S. Office Action, issued Feb. 24, 2015, for U.S. Appl. No. 14/223,360.

Al-Hadithi et al., "Fuzzy Optimal Control for Double Inverted Pendulum". 7th IEEE Conference on Industrial Electronics and Applications (ICIEA) 2012, pp. 1-5.

Chen, "Analysis and Design of Robust Feedback Control Systems for a Nonlinear Two-Wheel Inverted Pendulum System", 2012 International Symposium on Computer, Consumer and Control, IEEE, 2012, 1 page (abstract only).

Jiang et al., "High Gain Disturbance Observer and Its Application in Robust Control Attenuation", Proceeding of the IEEE International Conference of Information and Automation, IEEE, Aug. 2013, pp. 230-235.

Lee et al., "Application of Dynamic inversion with Extended High-Gain Observers to inverted Pendulum on a Cart", 2013 American Control Conference (ACC), Jun. 17-19, 2013, AACC, 4234-4238.

Yang et al., "Neural Network-Based Motion Control of Underactuated Wheeled Inverted Pendulum Models", IEEE Transactions on Neural Networks and Learning Systems, vol. 25, No. 11, Nov. 2014, pp. 2004-2016.

Zhang et al., "Variable Gain Linear Quadratic Regulator and its Application", Proceedings of 2014 IEEE International Conference on Mechatronics and Automation, Aug. 3-6, 2014, pp. 1745-1750.

European Office Communication for European Application No. 14161447.9, dated Jul. 23, 2015.

WHEN THERE IS NO TURNING REQUEST

WHEN THERE IS A TURNING REQUEST

BRAKE FORCE

INVERTED PENDULUM TYPE VEHICLE

CROSS-REFERENCE TO RELATED APPLICATIONS

The present application claims priority under 35 USC 119 to Japanese Patent Application No. 2013-074050 filed Mar. 29, 2013 the entire contents of which are hereby incorporated by reference.

BACKGROUND OF THE INVENTION

1. Field of the Invention

The present invention relates to an inverted pendulum type vehicle configured to be capable of moving in all directions on a floor surface.

2. Description of Background Art

An inverted pendulum type vehicle including a moving motion unit configured to be capable of moving in all directions on a floor surface and a tilting section capable of tilting with respect to the vertical direction is known. See, for example, JP-A No. 2011-063241. When used as a vehicle, the inverted pendulum type vehicle of this kind is provided with an occupant riding section in the tilting section. Also, the vehicle is moved by driving the moving motion unit by an actuator device according to tilting and the like of the occupant riding section on which an occupant rides.

In the conventional inverted pendulum type vehicle including only a single moving motion unit, the translational moving motion of the vehicle is executed to a direction corresponding to the tilting direction of the occupant riding section according to movement of the body of the occupant (body weight movement).

However, in this case, it is difficult in general for the occupant to smoothly move the body of the occupant himself or herself so as to smoothly and continuously change the moving direction of the vehicle.

Therefore, the conventional inverted pendulum type vehicle including only a single moving motion unit had a problem wherein it is difficult to smoothly execute the turning motion of the vehicle.

SUMMARY AND OBJECTS OF THE INVENTION

Therefore, in order that the turning motion of the vehicle can be executed easily, according to an embodiment of the present invention, an inverted pendulum type vehicle is provided wherein, in addition to a first moving motion unit as a main moving motion unit, a second moving motion unit as an auxiliary moving motion unit is further provided. Further, in addition to a drive control of the first moving motion unit, a drive control of the moving motion of the second moving motion unit is executed.

In this case, it is desirable that the second moving motion unit can be driven with a configuration at a lowest possible cost without using a complicated mechanism and control while easily enabling the execution of a turning motion of the vehicle.

The present invention has been developed in view of such background, and an object of an embodiment is to provide an inverted pendulum type vehicle for easily executing a turning motion of the vehicle with a configuration of a low cost.

In order to achieve such an object, the inverted pendulum type vehicle of an embodiment of the present invention is an inverted pendulum type vehicle including a first moving motion unit configured to be capable of moving in all directions on a floor surface, an actuator device for driving the first moving motion unit, a base for incorporating the first moving motion unit and the actuator device, an occupant riding section incorporated into the base so as to be tiltable with respect to the vertical direction, a tilting state detection unit that detects the tilting state of the occupant riding section and a first control unit configured to control the motion of the actuator device according to a detection result of the tilting state of the occupant riding section at least by the tilting state detection unit. The inverted pendulum type vehicle is further provided with a second moving motion unit disposed with an interval from the first moving motion unit and configured to be capable of moving in all directions on a floor surface, a brake device configured to be capable of generating a brake force imparted to the second moving motion unit and a second control unit that determines presence/absence of a request for turning motion of the inverted pendulum type vehicle, and when there is a request for the turning motion, controls a motion of the brake device so as to impart the brake force to the second moving motion unit.

According to an embodiment of the present invention, when there is a request for the turning motion of the inverted pendulum type vehicle (may be hereinafter simply referred to as a vehicle), a brake force is imparted to the second motion unit by control of the brake device by the second control unit.

Therefore, a difference in the moving speed comes to be caused between the first moving motion unit and the second moving motion unit which are grounding parts of the vehicle different from each other. As a result, the turning motion of the vehicle is executed without requiring a high steering skill of the occupant of the vehicle.

According to an embodiment of the present invention, because the brake device only has to be able to impart a brake force to the second moving motion unit by control of the second control unit, the brake device can be configured at a low cost without requiring a complicated mechanism and control.

Therefore, according to the inverted pendulum type vehicle of an embodiment of the present invention, the turning motion of the vehicle can be executed easily with a configuration produced at a low cost.

According to an embodiment of the present invention, for example, the second moving motion unit is disposed with an interval from the first moving motion unit in the front/rear direction of an occupant riding on the occupant riding section, and the brake device is configured to be capable of generating a brake force braking movement of the second moving motion unit toward the right/left direction out of the front/rear direction and the right/left direction of the occupant.

According to an embodiment of the present invention, the turning motion of the vehicle can be executed while the first moving motion unit is moved in the right/left direction of the occupant riding on the occupant riding section.

According to an embodiment of the present invention, it is preferable that the second moving motion unit is disposed behind the first moving motion unit in the front/rear direction of the occupant riding on the occupant riding section.

According to an embodiment of the present invention, the turning motion of the vehicle can be executed in a right turn (clockwise when the vehicle is viewed from above) in a state where the first moving motion unit moves to the right of the occupant riding on the occupant riding section. Also, the turning motion of the vehicle can be executed in a left turn (counterclockwise when the vehicle is viewed from above) in a state where the first moving motion unit moves to the left of the occupant riding on the occupant riding section. Therefore, the moving direction and the turning direction of the first moving motion unit at the time of turning of the vehicle conform to each other, and the steering performance of the vehicle can be improved.

According to an embodiment of the present invention, it is preferable that the brake device is configured to be capable of variably controlling the magnitude of a brake force imparted to the second moving motion unit by the second control unit.

According to an embodiment of the present invention, because the magnitude of the brake force imparted to the second moving motion unit can be variably controlled, the turning angular velocity, the turning radius and the like at the time of turning of the vehicle can be adjusted appropriately.

According to an embodiment of the present invention, for example, the second control unit is configured, when there is a request for the turning motion, to set a target turning angular velocity of the inverted pendulum type vehicle, and to control the magnitude of the brake force generated by the brake device according to the target turning angular velocity.

According to an embodiment of the present invention, by controlling the magnitude of the brake force generated by the brake device according to the target turning angular velocity, the turning motion of the vehicle at an angular velocity that agrees or generally agrees to the target turning angular velocity can be achieved.

Also, according to an embodiment of the present invention, the brake device is configured to include, for example, a brake disk arranged so as to rotate accompanying movement in a predetermined direction of the second moving motion unit, a caliper that sandwiches the brake disk, and a brake actuator that drives the caliper.

According to an embodiment of the present invention, the brake device can be configured simply.

Complementarily, according to an embodiment of the present invention, in executing the turning motion of the vehicle, for the turning motion, in addition to the generation of a brake force by the brake device, the moving speed of the first moving motion unit may be appropriately controlled.

Also, for example, such a configuration can be employed wherein, by operating an appropriate operation tool such as a joy stick, a smart phone and the like by the occupant, a turning command for executing the turning motion of the vehicle is outputted from the operation tool. In this case, when the turning command is outputted from the operation tool, the second control unit can determine that there is a request for the turning motion of the vehicle.

Or otherwise, the second control unit may determine that there is a request for the turning motion of the vehicle when, for example, the magnitude of the target value or the observed value of the leftward or rightward moving speed of a specific representative point or the first moving motion unit of the inverted pendulum type vehicle determined beforehand is a predetermined value or more.

Or otherwise, for example, an entirety gravity center shift estimation means is arranged which estimates the right/left direction entirety gravity center shift amount that is the relative moving amount in the right/left direction of the entirety gravity center of the occupant and the inverted pendulum type vehicle with respect to the occupant riding section caused by the occupant riding on the occupant riding section shifting the gravity center of the occupant himself or herself to the left or right relatively to the occupant riding section. Also, the second control unit may determine that there is a request for the turning motion of the vehicle when the magnitude of the estimate amount of the right/left direction entirety gravity center shift amount is a predetermined value or more.

By determining that there is a request for the turning motion of the vehicle when the magnitude of the target value or the observed value of the leftward or rightward moving speed of the specific representative point or the first moving motion unit is a predetermined value or more or when the magnitude of the estimate value of the right/left direction entirety gravity center shift amount is a predetermined value or more as described above, the occupant can easily execute the turning motion of the vehicle only by moving the body of the occupant himself or herself.

Also, the estimate value of the right/left direction entirety gravity center shift amount can be calculated consecutively by a calculation shown in the block diagram of FIG. 8 described below for example.

More specifically, by multiplying the deviation of the first estimate value $Vb\_estm1\_y$ and the second estimate value $Vb\_estm2\_y$ of the moving speed in the right/left direction of the gravity center of the entirety of the vehicle and the occupant (may be hereinafter referred to as a vehicle system entirety gravity center) by a gain of a specific value determined beforehand, the estimate value of the right/left direction entirety gravity center shift amount can be determined consecutively so as to converge to an actual value.

Here, the first estimate value $Vb\_estm1\_y$ is an estimate value of the moving speed in the right/left direction of the vehicle system center of gravity of the entirety kinematically calculated by expression (A) below, and the second estimate value $Vb\_estm2\_y$ is an estimate value of the moving speed calculated by integrating the movement acceleration $Dvb\_estm2\_y$ in the right/left direction of the vehicle system center of gravity of the entirety dynamically calculated by expression (B) below.

$$Vb\_estm1\_y = Vw1\_act\_y + h \cdot \omega b\_act\_y \quad (A)$$

$$Dvb\_estm\_y = (\theta b\_act\_y \cdot (h - r\_y) + Ofst\_estm\_y(k-1)) \cdot (g/h) - Vb\_estm1\_x \cdot \omega z\_act \quad (B)$$

wherein $Vw1\_act\_y$: the observed value of the moving speed in the right/left direction of the first moving motion unit h: the value determined beforehand as the height of the vehicle system center of gravity of the entirety from the floor surface $\omega b\_act\_y$: the observed value of the angular velocity of tilting of the occupant riding section in the direction around the axis in the front/rear direction $\theta b\_act\_y$: the observed value of the inclination angle in the direction around the axis in the front/rear direction (the inclination angle with respect to the vertical direction) of the occupant riding section $r\_y$: the height of the center of tilting of the occupant riding section in the direction around the axis in the front/rear direction from the floor surface $Ofst\_estm\_y(k-1)$: the newest value out of the estimated values of the right/left direction entirety gravity center shift amount having been calculated already g: gravity acceleration constant $Vb\_estm1\_x$: the estimate value of the moving speed in the front/rear direction of the vehicle system center of gravity of the entirety calculated by expression (C) below $$Vb\_estm1\_x = Vw1\_act\_x + h \cdot \omega b\_act\_x \quad (C)$$

$Vw1\_act\_x$: the observed value of the moving speed in the front/rear direction of the first moving motion unit $\omega b\_act\_x$: the observed value of the angular velocity of tilting of the occupant riding section in the direction around the axis in the right/left direction $\omega z\_act$: the angular velocity of the vehicle in the direction around the yaw axis Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
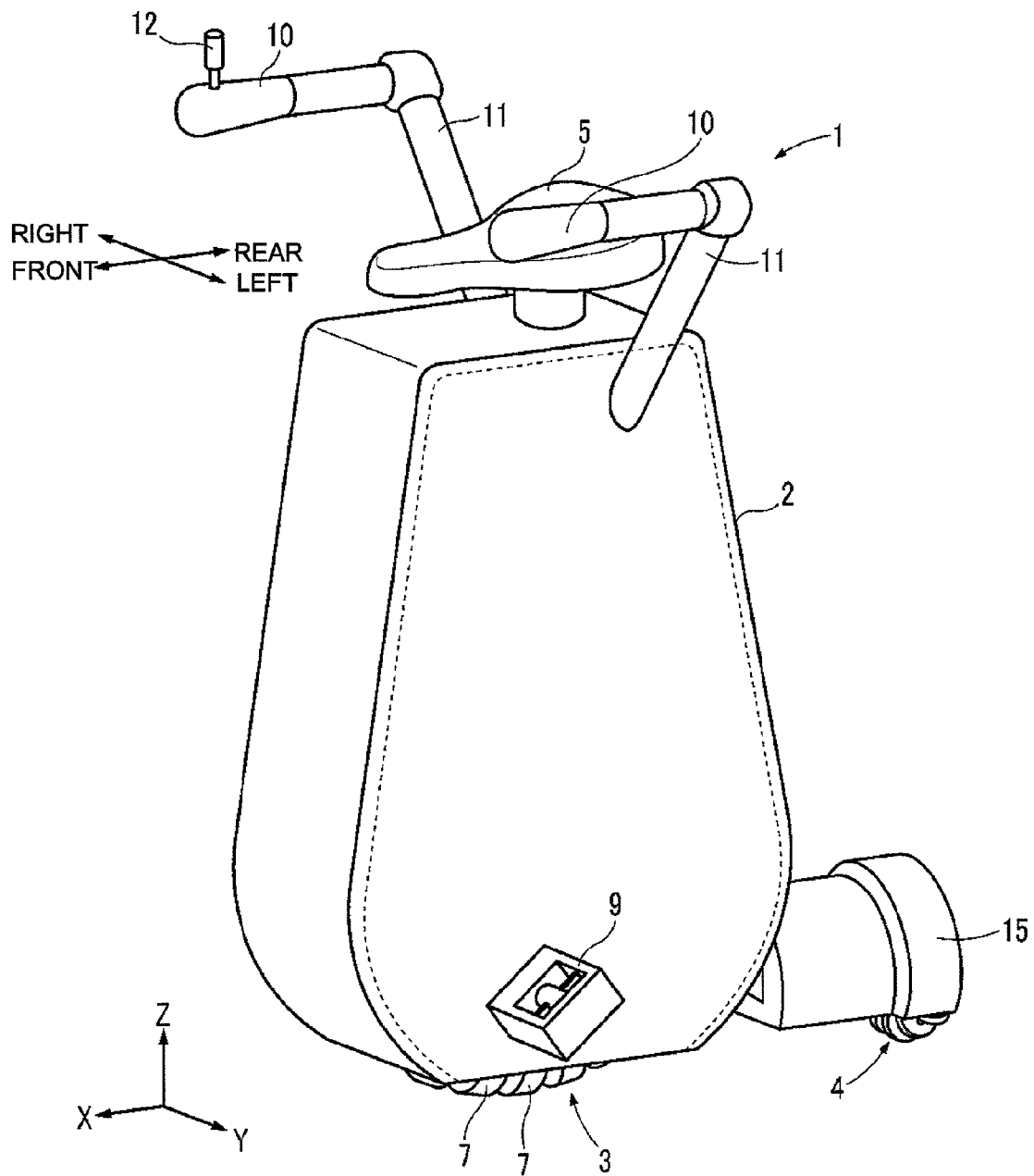
FIG. 1 is a perspective view of the outer appearance of the inverted pendulum type vehicle of the first embodiment of the present invention.
Figure 2:
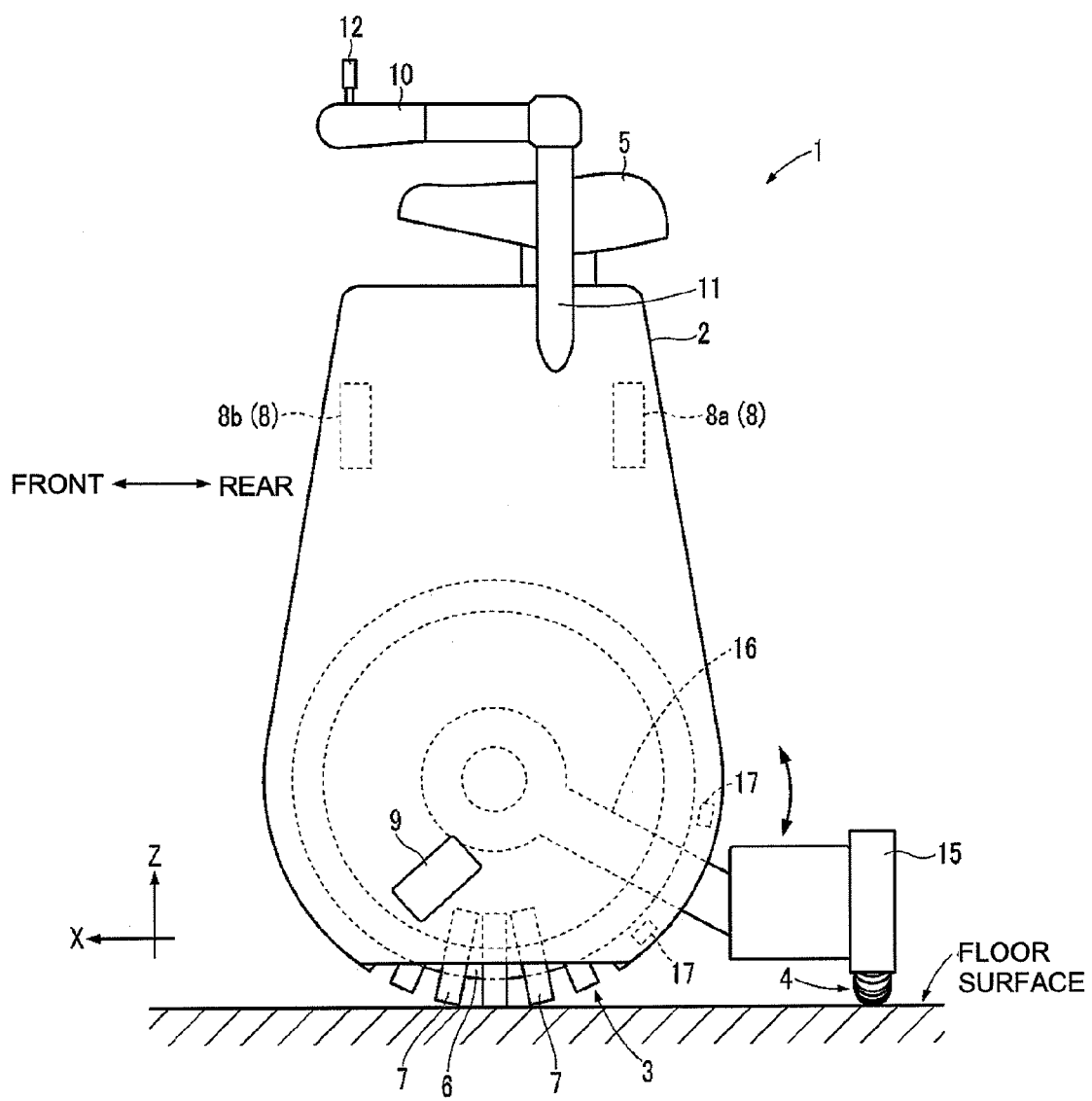
FIG. 2 is a side view of the inverted pendulum type vehicle of the first embodiment.
Figure 3:
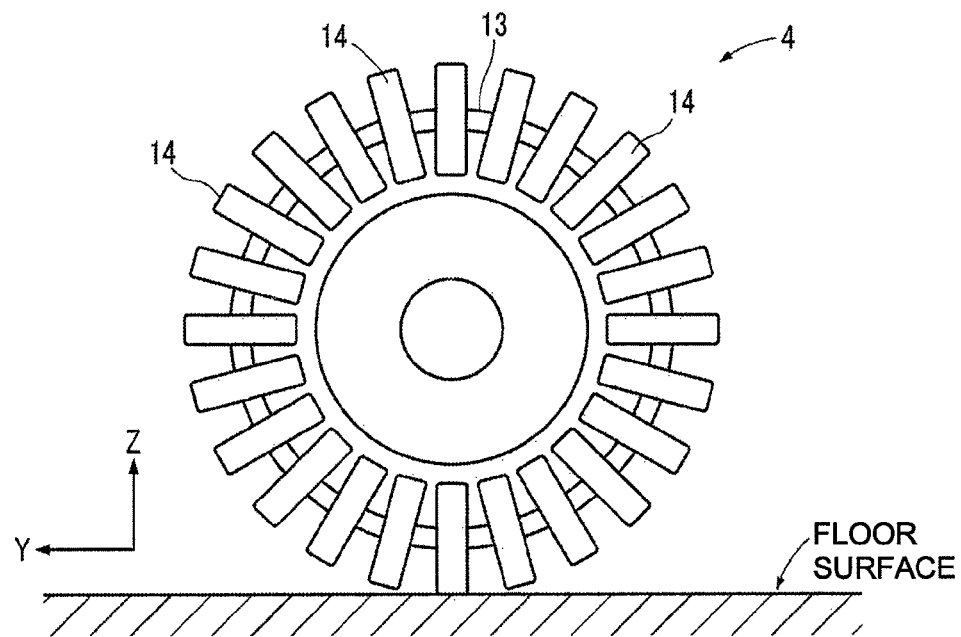
FIGS. 3(a) and 3(b) are drawings showing a configuration with the second moving motion unit and the brake device of the inverted pendulum type vehicle of the first embodiment.
Figure 3:
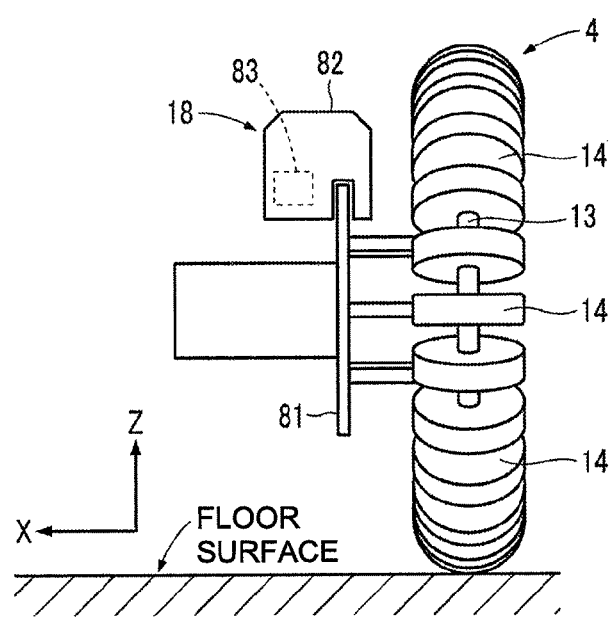

The first embodiment of the present invention will be described referring to FIG. 1 to FIG. 10(b). As shown in FIGS. 1 and 2, an inverted pendulum type vehicle 1 (may be hereinafter simply referred to as a vehicle 1) of the present embodiment includes a base 2, a first moving motion unit 3 and a second moving motion unit 4 capable of moving on a floor surface, and an occupant riding section 5 on which an occupant rides.

The first moving motion unit 3 includes a core body 6 of an annular shape shown in FIG. 2 (hereinafter referred to as an annular core body 6), and a plurality of rollers 7 of an annular shape mounted on the annular core body 6 so as to be arrayed at equal angular intervals in the circumferential direction (the direction around the axis of the annular core body 6. The respective rollers 7 are externally inserted to the annular core body 6 with their axis of rotation being directed to the circumferential direction of the annular core body 6. Also, the respective rollers 7 are made rotatable integrally with the annular core body 6 around the axis of the annular core body 6, and are made rotatable around the axis of the cross section of the annular core body 6 (the circumferential axis around the axis of the annular core body 6).

The first moving motion unit 3 including these annular core body 6 and the plurality of rollers 7 is grounded on the floor surface through the roller 7 (the roller 7 positioned at the lower part of the annular core body 6) in a state where the axis of the annular core body 6 is directed parallel to the floor surface. It is configured that, by rotationally driving the annular core body 6 around the axis thereof in this grounded state, the annular core body 6 and all of the respective rollers 7 roll, and thereby the first moving motion unit 3 moves on the floor surface to the direction orthogonal to the axis of the annular core body 6. Also, it is configured that, by rotationally driving the respective rollers 7 around the rotational axes thereof in the grounded state, the first moving motion unit 3 moves to the axial direction of the annular core body 6.

Further, it is configured that, by executing rotational drive of the annular core body 6 and rotational drive of the respective rollers 7, the first moving motion unit 3 moves to the direction orthogonal to the axis of the annular core body 6 and the direction inclined with respect to the axial direction of the annular core body 6.

Thus, the first moving motion unit 3 can move to all direction on the floor surface. In the description below, as shown in FIG. 1 and FIG. 2, out of the moving directions of the first moving motion unit 3, the direction orthogonal to the axis of the annular core body 6 is made the X-axis direction, the axial direction of the annular core body 6 is made the Y-axis direction, and the vertical direction is made the Z-axis direction. Also, the forward direction is made the positive direction of X-axis, the leftward direction is made the positive direction of Y-axis, and the upward direction is made the positive direction of Z-axis.

The first moving motion unit 3 is incorporated into the base 2. More specifically, the base 2 is arranged so as to cover the periphery of a portion excluding the lower part of the first moving motion unit 3 grounded on the floor surface. Also, the annular core body 6 of the first moving motion unit 3 is supported by the base 2 so as to be rotatable around the axis thereof.

In this case, the base 2 is made tiltable around the axis of the annular core body 6 of the first moving motion unit 3 (around Y-axis) with the axis of the annular core body 6 of the first moving motion unit 3 being a fulcrum, and is made tiltable around a X-axis orthogonal to the axis of the annular core body 6 with the grounding part of the first moving motion unit 3 being a fulcrum by being tilted with respect to the floor surfaced along with the first moving motion unit 3. Therefore, the base 2 is tiltable around two axes with respect to the vertical direction.

Also, inside the base 2, as shown in FIG. 2, an actuator device 8 that generates a drive force for moving the first moving motion unit 3 is mounted. The actuator device 8 is formed of an electric motor 8a as an actuator rotationally driving the annular core body 6 and an electric motor 8b as an actuator rotationally driving the respective rollers 7. Further, it is configured that the electric motors 8a, 8b impart a rotational drive force to the annular core body 6 and the respective rollers 7 through power transmission mechanisms whose illustrations are omitted. Also, the power transmission mechanisms may have a known structure.

The first moving motion unit 3 may have a structure different from the structure described above. For example, as the structure of the first moving motion unit 3 and the drive system thereof, those having a structure proposed by the present applicant in PCT Unexamined International Application WO/2008/132778 or PCT Unexamined International Application WO/2008/132779 may be employed.

Also, the occupant riding section 5 is incorporated into the base 2. The occupant riding section 5 is formed of a seat on which the occupant sits, and is fixed to the upper end of the base 2. Further, the occupant can sit on the occupant riding section 5 with the occupant's front/rear direction being directed to the X-axis direction and the occupant's right/left direction being directed to the Y-axis direction. Also, because the occupant riding section 5 (seat) is fixed to the base 2, it is made tiltable with respect to the vertical direction integrally with the base 2.

Complementarily, the first moving motion unit 3 and the base 2 may be configured so as not to tilt (the attitude in the pitching direction and the rolling direction is maintained generally constant). In this case, the occupant riding section 5 may be configured so as to be tiltably supported by the base 2 through a ball joint and the like.

A pair of footrests 9, 9 on which the occupant sitting on the occupant riding section 5 places the occupant's feet and a pair of holders 10, 10 held by the occupant are further incorporated into the base 2.

The footrests 9, 9 are arranged projectingly in the lower part of both sides of the base 2. Also, in FIG. 1 and FIG. 2, illustration of the footrest 9 on one side (right side) is omitted.

Further, the holders 10, 10 have a bar shape disposed so as to extend in the X-axis direction (front/rear direction) on both sides of the occupant riding section 5 and are respectively fixed to the base 2 through rods 11 extending from the base 2. Also, a joy stick 12 as an operation tool is attached to one holder 10 (the holder 10 on the right side in the drawing) out of the holders 10, 10.

The joy stick 12 is made swingably operable in the front/rear direction (X-axis direction) and the right/left direction (Y-axis direction). Also, the joy stick 12 outputs operation signals showing the swing amount thereof in the front/rear direction (X-axis direction) and the direction of the swing (forward or rearward) thereof as an advancing/retreating command that makes the vehicle 1 move forward or rearward, and outputs operation signals showing the swing amount in the right/left direction (Y-axis direction) and the direction of the swing (rightward or leftward) thereof as a transverse moving command that makes the vehicle 1 move in the right/left direction.

The second moving motion unit 4 is disposed behind the first moving motion unit 3 with an interval in the X-axis direction (the front/rear direction) from the first moving motion unit 3.

In the present embodiment, this second moving motion unit 4 has a structure similar to that of the first moving motion unit 3. More specifically, as shown in FIGS. 3(a) and 3(b), the second moving motion unit 4 includes a core body 13 of an annular shape (hereinafter referred to as an annular core body 13), and the plurality of rollers 14 installed on the annular core body 13 that are arrayed at an equal angular distance in the circumferential direction (the direction around the axis) of the annular core body 13.

Each roller 14 is externally inserted to the annular core body 13 with its rotational axis being directed to the circumferential direction of the annular core body 13. Also, each roller 14 is made rotatable integrally with the annular core body 13 around the axis of the annular core body 13, and is made rotatable around the center axis of the cross section of the annular core body 13 (the circumferential axis with the axis of the annular core body 13 being the center).

The entirety (assembly) of these annular core body 13 and rollers 14 is grounded to the floor surface through rollers 14 of the lower part behind the first moving motion unit 3 in a state where the axis of the annular core body 13 is directed in the X-axis direction (the front/rear direction).

Also, the second moving motion unit 4 includes a case 15 that covers the upper part of the entirety of the annular core body 13 and the rollers 14. By this case 15, the annular core body 13 is supported so as to be rotatable around the axis thereof.

Further, an arm 16 extending from the case 15 to the base 2 side is journaled to the base 2 so as to be swingable around the axis of the annular core body 6 of the first moving motion unit 3. Thus, the second moving motion unit 4 is connected to the base 2 through the arm 16.

Also, the second moving motion unit 4 is made swingable with respect to the base 2 around the axis of the annular core body 6 of the first moving motion unit 3 by swinging of the arm 16, and thereby it is possible to tilt the occupant riding section 5 around Y-axis along with the base 2 while both of the first moving motion unit 3 and the second moving motion unit 4 are grounded.

Further, the second moving motion unit 4 may be connected to the first moving motion unit 3 through the arm 16 with the arm 16 being journaled to the axis section of the annular core body 6 of the first moving motion unit 3.

Also, a pair of stoppers 17, 17 restricting the swing range of the arm 16 is arranged in the base 2, and the arm 16 is allowed to swing within the range between the stoppers 17, 17. Thus, the swing range of the second moving motion unit 4 around the axis of the annular core body 6 of the first moving motion unit 3 and the tilting range around X-axis of the base 2 and the occupant riding section 5 are restricted, and the base 2 and the occupant riding section 5 are configured to be prevented from tilting excessively to the rear side of the occupant.

Further, the second moving motion unit 4 may be energized by a spring so as to be pressed to the floor surface.

The second moving motion unit 4 configured as described above is allowed to move in all directions including the X-axis direction and the Y-axis direction on the floor surface so as to follow the movement of the first moving motion unit 3 by passively executing either one or both of the rotation of the annular core body 13 and the rotation of the rollers 14 accompanying movement of the first moving motion unit 3. In this case, the second moving motion unit 4 is made movable in the Y-axis direction (the right/left direction) by rotation of the annular core body 13, and is made movable in the X-axis direction (the front/rear direction) by rotation of the rollers 14.

Also, on the case 15 of the second moving motion unit 4, a brake device 18 capable of generating a brake force that brakes movement in the Y-axis direction (the right/left direction) of the second moving motion unit 4 is mounted. As shown in FIG. 3(b), this brake device 18 includes a brake disk 81 connected to the annular core body 13 so as to rotate integrally with the annular core body 13, and a caliper 82 sandwiching the circumferential edge of the brake disk 81.

In the caliper 82, a brake actuator 83 formed of an electric motor or an electromagnetic solenoid and the like is built-in, and the caliper 82 is configured to be driven by a drive force of the brake actuator 83 (it is configured that the sandwiching motion of the brake disk 81 by the caliper 82 is executed).

Also, the brake device 18 brakes rotation of the brake disk 81 and the annular core body 13 by a friction force by sandwiching the circumferential edge of the brake disk 81 by the caliper 82. Thus, the brake device 18 is configured to be capable of generating the brake force braking movement in the Y-axis direction of the second moving motion unit 4.

Here, the brake force generated by the brake device 18 as described above brakes rotation of the annular core body 13. Also, regardless of whether the brake device 18 is in a state of generating the brake force or not, the each roller 14 is rotatable around each axis.

Therefore, in the present embodiment, the second moving motion unit 4 is passively movable following the first moving motion unit 3 (at a moving speed generally equal to that of the first moving motion unit 3) in all direction including the X-axis direction (the front/rear direction) and the Y-axis direction (the right/left direction) by rotation of both or either of the annular core body 13 and the rollers 14 in a state where the brake device 18 does not generate a brake force.

On the other hand, in a state where a brake force by the brake device 18 is generated, although the second moving motion unit 4 is passively movable following the first moving motion unit 3 in the X-axis direction (the front/rear direction) by rotation of the rollers 14 of the grounding part thereof, movement in the Y-axis direction (the right/left direction) is restricted, and the moving speed in the Y-axis direction becomes slower than that of the first moving motion unit 3 (a case where the moving speed in the Y-axis direction becomes zero is included).

Complementarily, the second moving motion unit 4 may have a structure different from that of the first moving motion unit 3 (an omni-wheel for example). Also, the brake device 18 may employ a structure different from the above.

The above is the mechanical configuration of the vehicle 1 in the present embodiment.

Figure 4:
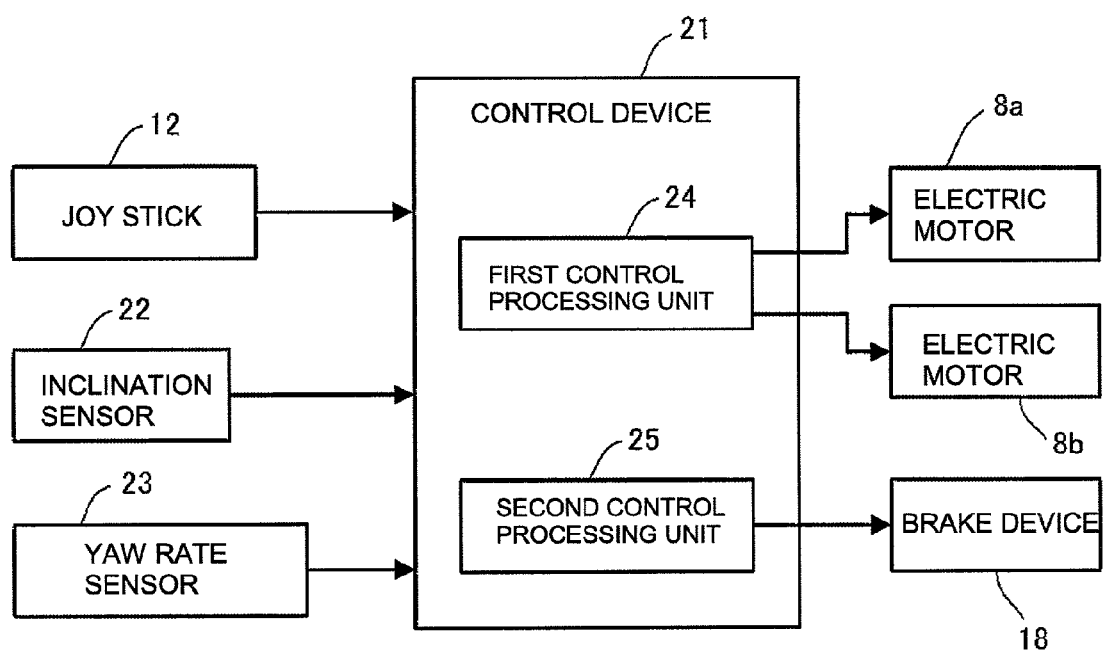
FIG. 4 is a block diagram showing a configuration for controlling the inverted pendulum type vehicle of the first embodiment.

Although illustration in FIG. 1 and FIG. 2 is omitted, on the base 2 of the vehicle 1 of the present embodiment, as a configuration for motion control of the vehicle 1 (motion control of the first moving motion unit 3 and the second moving motion unit 4), as shown in FIG. 4, a control device 21 formed of an electronic circuit unit including a CPU, a RAM, a ROM and the like, an inclination sensor 22 for measuring the inclination angle of the occupant riding section 5 (the inclination angle of the base 2) with respect to the vertical direction, and a yaw rate sensor 23 for measuring the angular velocity around the yaw axis of the vehicle 1 are mounted.

To the control device 21, the output of the joy stick 12 and the detection signal of the inclination sensor 22 and the yaw rate sensor 23 are configured to be inputted.

Also, the control device 21 may be formed of a plurality of electronic circuit units that are in communication with each other.

The inclination sensor 22 corresponds to an inclination state detection unit in the present invention, and is formed of an acceleration sensor and an angular velocity sensor such as a gyro-sensor. Also, the control device 21 acquires the measured value of the inclination angle of the occupant riding section 5 (in other words, the inclination angle of the base 2) using a known method from the detection signal of these acceleration sensor and angular velocity sensor. As for the method, for example, a method proposed by the present inventors as disclosed in Japanese Patent No. 4181113 can be employed.

Also, more specifically, the inclination angle of the occupant riding section 5 (or the inclination angle of the base 2) in the present embodiment is the inclination angle that makes the attitude of the occupant riding section 5 (or the base 2), in a state where the gravity center of the entirety including the vehicle 1 and the occupant riding on the occupant riding section 5 of the vehicle 1 with a predetermined attitude (standard attitude) is positioned just above (above in the vertical direction) of the grounding part of the first moving motion unit 3, a reference (zero) (a set of the inclination angle in the direction around X-axis and the inclination angle in the direction around Y-axis).

Further, the yaw rate sensor 23 is formed of an angular velocity sensor such as a gyro-sensor and the like. Also, the control device 21 acquires the measured value of the angular velocity around the yaw axis of the vehicle 1 based on the detection signal of the angular velocity sensor.

Also, as a function achieved by an installed program and the like (a function achieved by software) or a function constructed by hardware, in addition to the function of acquiring the measured values as described above, the control device 21 includes a first control processing unit 24 that controls the moving motion of the first moving motion unit 3 by controlling the electric motors 8a, 8b that form the actuator device 8, and a second control processing unit 25 that controls the moving motion of the second moving motion unit 4 by controlling the brake actuator 83 of the brake device 18. The first control processing unit 24 and the second control processing unit 25 correspond to the first control unit and the second control unit in the present invention, respectively.

By executing calculation processing described below, the first control processing nit 24 consecutively calculates the first target speed that is the target value of the moving speed of the first moving motion unit 3 (more specifically, a set of the translational speed in the X-axis direction and the translational speed in the Y-axis direction), and controls the rotational speed of the electric motors 8a, 8b so that the actual moving speed of the first moving motion unit 3 agrees to the first target speed.

In this case, the relation between each rotational speed of the electric motors 8a, 8b and the actual moving speed of the first moving motion unit 3 is determined beforehand, and it is configured that the target value of the rotational speed of the electric motors 8a, 8b is decided according to the first target speed of the first moving motion unit 3. Also, by feedback-control of the rotational speed of the electric motors 8a, 8b to the target value decided according to the first target speed, the actual moving speed of the first moving motion unit 3 is controlled to the first target speed.

Also, by executing calculation processing described below, the second control processing unit 25 consecutively determines an manipulated variable (control input) for controlling the motion of the brake device 18, and controls the brake force of the brake device 18 according to the manipulated variable.

Next, processing of the first control processing unit 24 and the second control processing unit 25 will be described in more detail. First, processing of the first control processing unit 24 will be described referring to FIG. 5 to FIG. 8.

Figure 5:
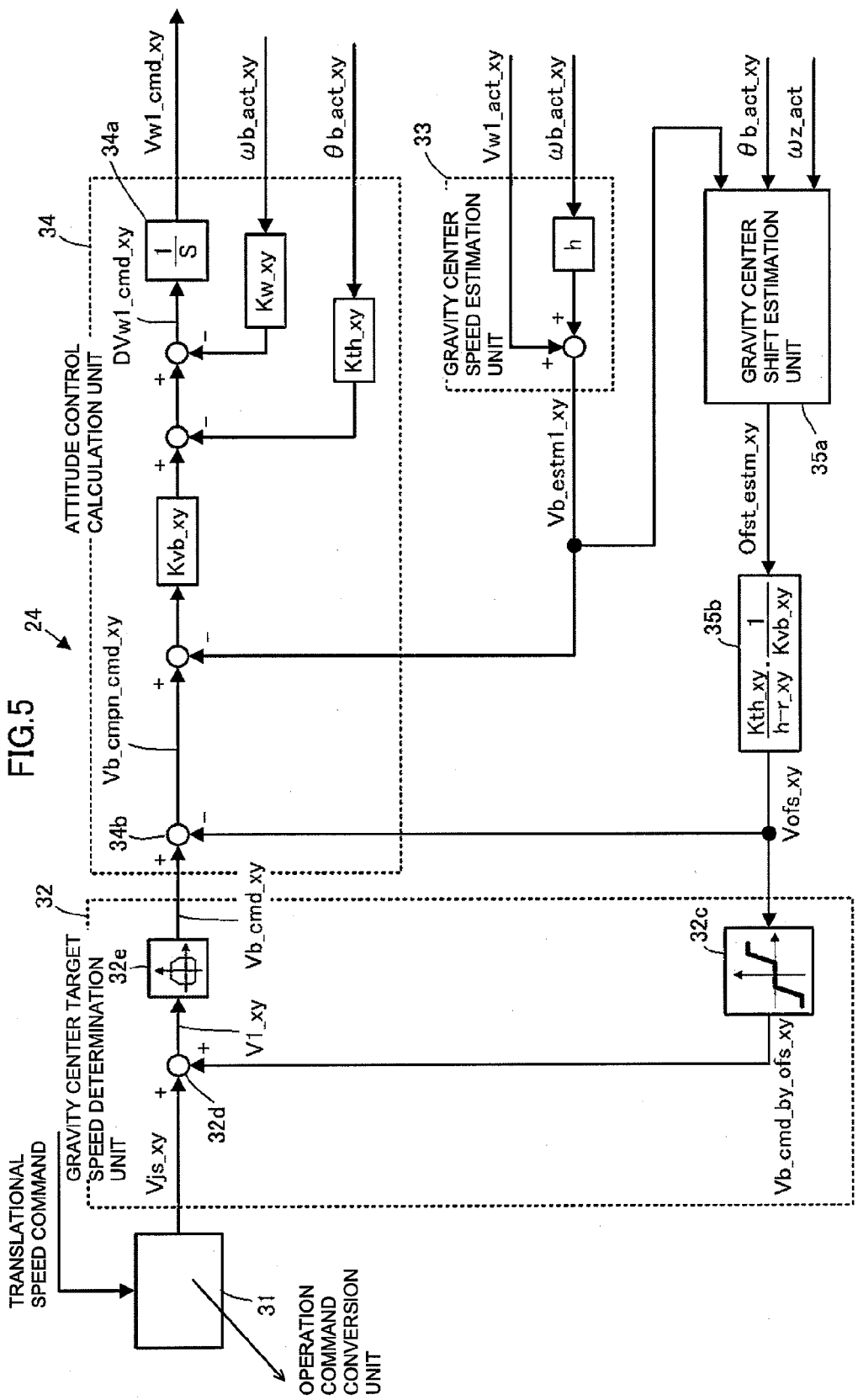
FIG. 5 is a block diagram showing processing of the first control processing unit shown in FIG. 4.

As shown in FIG. 5, the first control processing unit 24 includes, as main function units thereof, an operation command conversion unit 31 that converts the command inputted from the joy stick 12 (turning command and advancing/retreating command) to the speed command of the vehicle 1 in the X-axis direction (front/rear direction) and the Y-axis direction (right/left direction), a gravity center target speed determination unit 32 that determines the target speed of the center of gravity of the entirety including the vehicle 1 and the occupant riding on the occupant riding section 5 thereof (hereinafter referred to as the vehicle system center of gravity of the entirety), a gravity center speed estimation unit 33 that estimates the speed of the vehicle system center of gravity of the entirety, and an attitude control calculation unit 34 that determines the target value of the moving speed of the first moving motion unit 3 so as to control the attitude of the occupant riding section 5 (the attitude of the base 2) while making the speed of the vehicle system center of gravity of the entirety estimated follow the target speed. Also, the first control processing unit 24 executes processing of these respective function units at a predetermined calculation processing period of the control device 21.

Further, in the present embodiment, the vehicle system center of gravity of the entirety has a meaning as an example of the representative point of the vehicle 1. Therefore, the speed of the vehicle system center of gravity of the entirety means the moving speed of the representative point of the vehicle 1.

Figure 6:
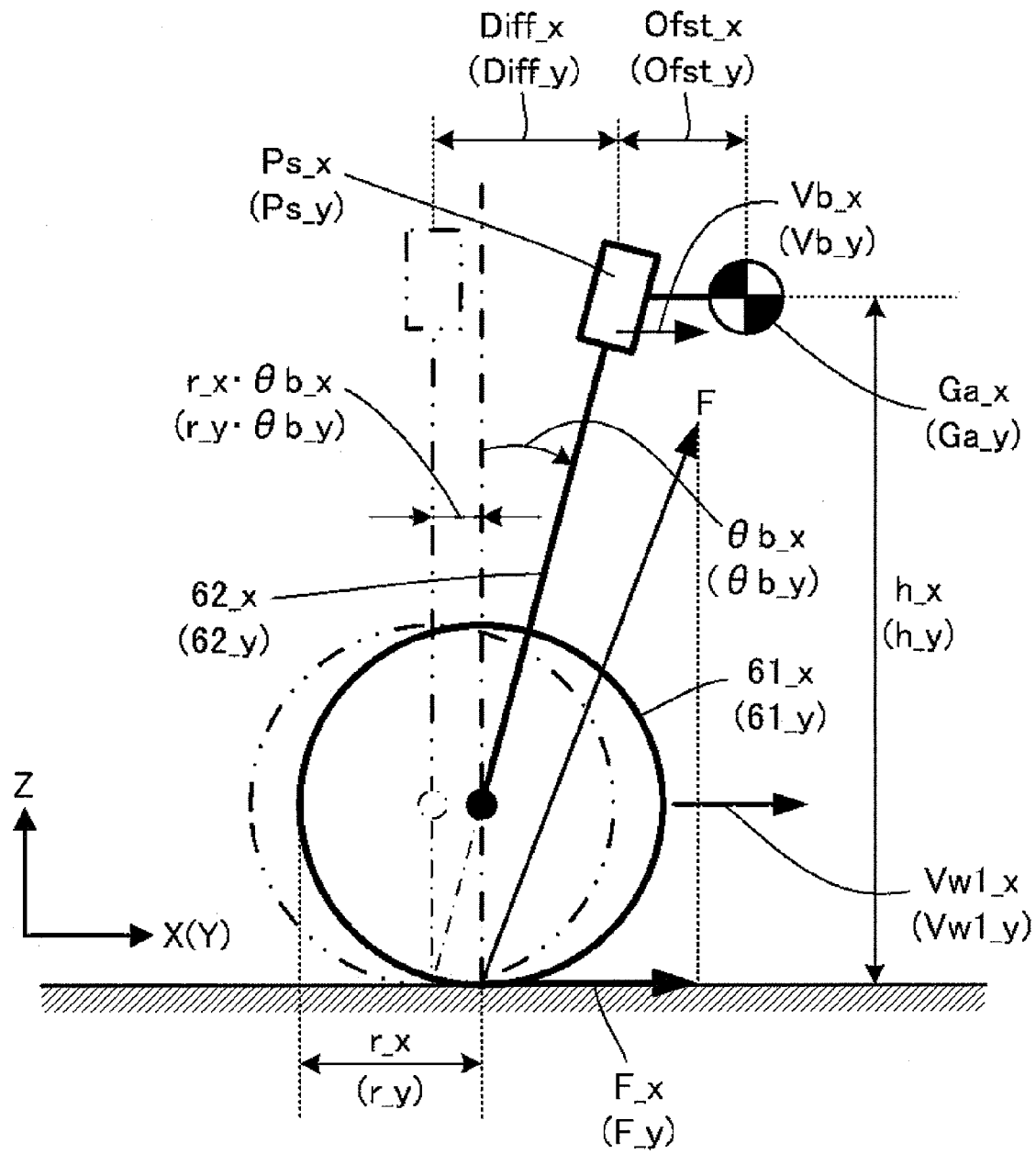
FIG. 6 is a drawing for explaining an inverted pendulum model used for processing of the first control processing unit shown in FIG. 4.

Before processing of the respective function units of the first control processing unit 24 is described specifically, facts that become the base of the processing will be described. The dynamic behavior of the vehicle system center of gravity of the entirety (more specifically, the behavior as viewed in the Y-axis direction and the behavior as viewed in the X-axis direction) is approximately expressed by the behavior of an inverted pendulum model as shown in FIG. 6. The algorithm of the processing of the first control processing unit 24 is constructed on the basis of this behavior.

Also, including the reference signs in FIG. 6, in the description below, the suffix "_x" means the reference sign of the variables and the like as viewed from the Y-axis direction, and the suffix "_y" means the reference sign of the variables and the like as viewed from the X-axis direction. Further, in FIG. 6, in order to illustrate both of the inverted pendulum model as viewed from the Y-axis direction and the inverted pendulum model as viewed from the X-axis direction, the reference signs of the variables as viewed from the Y-axis direction is not in parentheses, and the reference signs of the variables as viewed from the X-axis direction is in parentheses.

The inverted pendulum model expressing the behavior of the vehicle system center of gravity of the entirety as viewed from the Y-axis direction includes an imaginary wheel 61_x having the rotation axis parallel to the Y-axis direction and rollable on the floor surface (hereinafter referred to as the imaginary wheel 61_x), a rod 62_x extended from the rotation center of the imaginary wheel 61_x and swingable around the rotation axis of the imaginary wheel 61_x (in the direction around Y-axis), and a mass point Ga_x connected to a reference Ps_x that is the distal end (upper end) of the rod 62_x.

In the inverted pendulum model, the motion of the mass point Ga_x is equivalent to the motion of the vehicle system center of gravity of the entirety as viewed from the Y-axis direction, and the inclination angle θb_x (the inclination angle in the direction around Y-axis) of the rod 62_x with respect to the vertical direction agrees to the inclination angle in the direction around Y-axis of the occupant riding section 5 (or the base 2). Also, the translational motion in the X-axis direction of the first moving motion unit 3 is equivalent to the translational motion in the X-axis direction caused by rolling of the imaginary wheel 61_x.

Further, the radius r_x of the imaginary wheel 61_x and the height h_x of the reference Ps_x and the mass point Ga_x from the floor surface are made preset values (constant values) that are set beforehand. Also, in other words, r_x is equivalent to the height of the center of tilting of the occupant riding section 5 (or the base 2) in the direction around −Y-axis from the floor surface. In the present embodiment, this r_x is equivalent to the distance between the axis of the annular core bodies 6 of the first moving motion unit 3 and the grounding surface.

In a similar manner, the inverted pendulum model expressing the behavior of the vehicle system center of gravity of the entirety as viewed from the X-axis direction includes an imaginary wheel 61_y having the rotation axis parallel to the X-axis direction and rollable on the floor surface (hereinafter referred to as the imaginary wheel 61_y), a rod 62_y extended from the rotation center of the imaginary wheel 61_y and swingable around the rotation axis of the imaginary wheel 61_y (in the direction around X-axis), and a mass point Ga_y connected to a reference Ps_y that is the distal end (upper end) of the rod 62_y.

In the inverted pendulum model, the motion of the mass point Ga_y is equivalent to the motion of the vehicle system center of gravity of the entirety as viewed from the X-axis direction, and the inclination angle θb_y (the inclination angle in the direction around X-axis) of the rod 62_y with respect to the vertical direction agrees to the inclination angle in the direction around X-axis of the occupant riding section 5 (or the base 2). Also, the translational motion in the Y-axis direction of the first moving motion unit 3 is equivalent to the translational motion in the Y-axis direction caused by rolling of the imaginary wheel 61_y.

Further, the radius r_y of the imaginary wheel 61_y and the height by of the reference Ps_y and the mass point Ga_y from the floor surface are made preset values (constant values) that are set beforehand. Also, in other words, r_y is equivalent to the height of the center of tilting of the occupant riding section 5 (or the base 2) in the direction around X-axis from the floor surface. In the present embodiment, this r_y is equivalent to the radius of the rollers 7 of the first moving motion unit 3. Also, the height by of the reference Ps_y and the mass point Ga_y as viewed from the X-axis direction from the floor surface is the same as the height h_x of the reference Ps_x and the mass point Ga_x as viewed from the Y-axis direction from the floor surface. Therefore, h_x=h_y=h is to be hereinafter noted.

A comment will be added on the positional relation between the reference Ps_x and the mass point Ga_x as viewed from the Y-axis direction. The position of the reference Ps_x is equivalent to the position of the vehicle system center of gravity of the entirety in a case where the occupant riding (sitting on) the occupant riding section 5 is assumed to be immobile with respect to the occupant riding section 5. Therefore, in this case, the position of the mass point Ga_x agrees to the position of the reference Ps_x. This is similar also with respect to the positional relation between the reference Ps_y and the mass point Ga_y as viewed from the X-axis direction.

However, in fact, an occupant riding on the occupant riding section 5 moves the upper body and the like thereof with respect to the occupant riding section 5 (or the base 2), and thereby the position in the X-axis direction and the position in the Y-axis direction of the actual vehicle system center of gravity of the entirety comes to be shifted to the lateral direction respectively from the positions of the reference Ps_x, Ps_y in general. Therefore, in FIG. 5, the positions of the mass points Ga_x, Ga_y are illustrated in a state shifted respectively from the positions of the reference Ps_x, Ps_y.

The behavior of the vehicle system center of gravity of the entirety expressed by the inverted pendulum model as described above is expressed by expressions (1a), (1b), (2a), (2b) below. In this case, the expressions (1a), (1b) express the behavior as viewed in the Y-axis direction, and the expressions (2a), (2b) express the behavior as viewed in the X-axis direction.

$$Vb\_x = Vw1\_x + h\_x \cdot \omega b\_x \qquad (1a)$$

$$dVb\_x/dt = (g/h) \cdot (\theta b\_x \cdot (h - r\_x) + Ofst\_x) + \omega z \cdot Vb\_y \qquad (1b)$$

$$Vb\_y = Vw1\_y + h\_y \cdot \omega b\_y \quad (2a)$$

$$dVb\_y/dt = (g/h) \cdot (\theta b\_y \cdot (h - r\_y) + \text{Ofst}\_y) - \omega z \cdot Vb\_x \quad (2b)$$

Here, Vb_x is the speed (translational speed) in the X-axis direction of the vehicle system center of gravity of the entirety, Vw1_x is the moving speed (translational speed) in the X-axis direction of the imaginary wheel 61_x, θb_x is the inclination angle in the direction around Y-axis of the occupant riding section 5 (or the base 2), ωb_x is the temporal change rate of θb_x (=dθb_x/dt), Ofst_x is the shift amount in the X-axis direction of the position in the X-axis direction of the vehicle system center of gravity of the entirety (the position in the X-axis direction of the mass point Ga_x) from the position of the reference Ps_x, Vb_y is the speed (translational speed) in the Y-axis direction of the vehicle system center of gravity of the entirety, Vw1_y is the moving speed (translational speed) in the Y-axis direction of the imaginary wheel 61_y, θb_y is the inclination angle in the X-axis direction of the occupant riding section 5 (or the base 2), ωb_y is the temporal change rate of θb_y (=dθb_y/dt), and Ofst_y is the shift amount in the Y-axis direction of the position in the Y-axis direction of the vehicle system center of gravity of the entirety (the position in the Y-axis direction of the mass point Ga_y) from the position of the reference Ps_y. Also, ωz is the yaw rate (the angular velocity in the direction around the yaw axis) when the vehicle 1 turns, and g is the gravitational acceleration constant. Further, the positive direction of θb_x, ωb_x is the direction that the vehicle system center of gravity of the entirety inclines to the positive direction of X-axis (forward), and the positive direction of θb_y, ωb_y is the direction that the vehicle system center of gravity of the entirety inclines to the positive direction of Y-axis (leftward). Furthermore, the positive direction of ωz is the counterclockwise direction when the vehicle 1 is viewed from above.

Also, Vb_x, Vb_y agree to the moving speed in the X-axis direction of the reference Ps_x and the moving speed in the Y-axis direction of the reference Ps_y, respectively.

The second term of the right side of the expression (1a) (=h·ωb_x) is the translational speed component in the X-axis direction of the reference Ps_x generated by tilting of the occupant riding section 5 in the direction around Y-axis, and the second term of the right side of the expression (2a) (=h·ωb_y) is the translational speed component in the Y-axis direction of the reference Ps_y generated by tilting of the occupant riding section 5 in the direction around –X-axis.

In addition, more specifically, Vw1_x in the expression (1a) is the relative circumferential speed of the imaginary wheel 61_x with respect to the rod 62_x (in other words, with respect to the occupant riding section 5 or the base 2). Therefore, in Vw1_x, in addition to the moving speed in the X-axis direction of the grounding point of the imaginary wheel 61_x to the floor surface (the moving speed in the X-axis direction of the grounding point of the first moving motion unit 3 to the floor surface), a velocity component accompanying tilting of the rod 62_x(=r_x·ωb_x) is included. This fact is also similar to Vw1_y in the expression (2a).

Also, the first term of the right side of the expression (1b) is the acceleration component in the X-axis direction generated in the vehicle system center of gravity of the entirety by the component in the X-axis direction (F_x in FIG. 6) of the floor reaction force (F in FIG. 6) applied to the grounding part of the imaginary wheel 61_x according to the shift amount (=θb_x·(h−r_x)+Ofst_x) of the position in the X-axis direction of the vehicle system center of gravity of the entirety (the position in the X-axis direction of the mass point Ga_x) from the upper position in the vertical direction of the grounding part of the imaginary wheel 61_x (the grounding part of the first moving motion unit 3 as viewed in the Y-axis direction), and the second term of the right side of the expression (1b) is the acceleration component in the X-axis direction generated by the centrifugal force applied to the vehicle 1 in turning at the yaw rate of ωz.

Similarly, the first term of the right side of the expression (2b) is the acceleration component in the Y-axis direction generated in the vehicle system center of gravity of the entirety by the component in the Y-axis direction (F_y in FIG. 6) of the floor reaction force (F in FIG. 6) applied to the grounding part of the imaginary wheel 61_y according to the shift amount (=θb_y·(h−r_y)+Ofst_y) of the position in the Y-axis direction of the vehicle system center of gravity of the entirety (the position in the Y-axis direction of the mass point Ga_y) from the upper position in the vertical direction of the grounding part of the imaginary wheel 61_y (the grounding part of the first moving motion unit 3 as viewed in the X-axis direction), and the second term of the right side of the expression (2b) is the acceleration component in the Y-axis direction generated by the centrifugal force applied to the vehicle 1 in turning at the yaw rate of ωz.

Figure 7:
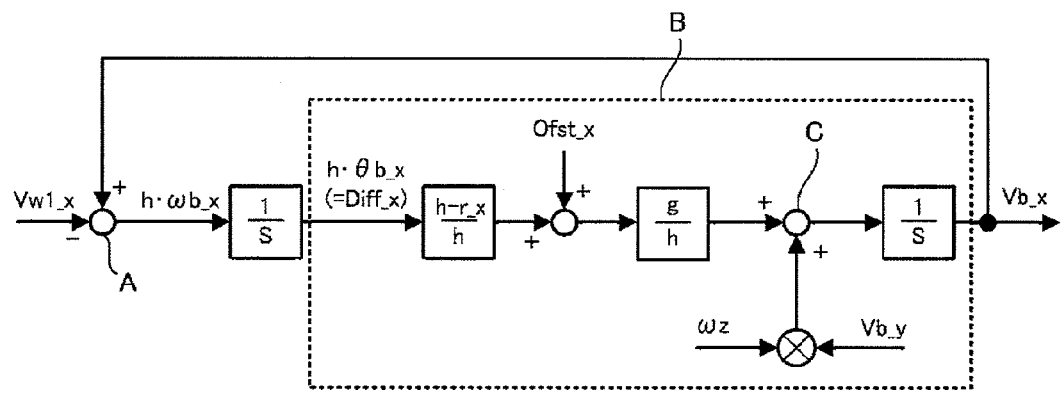
FIG. 7 is a block diagram showing a behavior in relation with the inverted pendulum model of FIG. 6.

As described above, the behavior expressed by the expressions (1a), (1b) (the behavior as viewed in the X-axis direction) is expressed as shown in FIG. 7 when expressed by a block diagram. 1/s in the drawing expresses integral calculation.

Also, processing of the calculation unit marked with the reference sign A in FIG. 7 corresponds to the relation formula of the expression (1a), and processing of the calculation unit marked with the reference sign B corresponds to the relation formula of the expression (1b).

Further, h·θb_x in FIG. 7 approximately agrees to Diff_x shown in FIG. 6.

On the other hand, the block diagram that expresses the behavior expressed by the expressions (2a), (2b) (the behavior as viewed in the Y-axis direction) is obtained by substituting "_y" for the suffixes "_x" in FIG. 7 and substituting "−" for the marks "+" of the acceleration component (the acceleration component generated by the centrifugal force) on the lower side in the drawing that is one of the inputs to the adder marked with the reference sign C.

In the present embodiment, as described above, the algorithm of processing of the first control processing unit 24 is constructed based on a behavior model of the vehicle system center of gravity of the entirety (inverted pendulum model) that takes the shift amount of the vehicle system center of gravity of the entirety from the references Ps_x, Ps_y and the centrifugal force into consideration.

On the premise of the above, processing of the first control processing unit 24 will be described more specifically. Also, in the description below, a set of a value of a variable in relation with the behavior as viewed from the Y-axis direction and a value of a variable in relation with the behavior as viewed from the X-axis direction may be expressed adding the suffix "_xy".

Reference is made to FIG. 5. At each calculation processing period of the control device 21, the first control processing unit 24 executes processing of the operation command conversion unit 31 and processing of the gravity center speed estimation unit 33 first.

The operation command conversion unit 31 determines a basic speed command Vjs_xy that is a basic command value of the moving speed (translational speed) of the first moving motion unit 3 according to an advancing/retreating command given by the joy stick 12 (an operation signal showing the swing amount in the X-axis direction of the joy stick 12 and the direction of the swing thereof) or a transverse moving command (an operation signal showing the swing amount in the Y-axis direction of the joy stick 12 and the direction of the swing thereof).

In this case, out of the basic speed command Vjs_xy, the basic speed command Vjs_x in the X-axis direction is determined according to the advancing/retreating command. More specifically, when the swing amount of the joy stick 12 shown by the advancing/retreating command is a swing amount toward the front, the basic speed command Vjs_x in the X-axis direction is made the speed command for the advancing direction of the vehicle 1, and, when the swing amount of the joy stick 12 is a swing amount toward the rear, the basic speed command Vjs_x in the X-axis direction is made the speed command for the retreating direction of the vehicle 1. Also, in this case, the magnitude of the basic speed command Vjs_x in the X-axis direction is determined so as to increase in the range of a predetermined upper limit value or below as the swing amount of the joy stick 12 to the front side or the rear side increases.

Further, a predetermined range where the swing amount of the joy stick 12 to the front side or the rear side becomes minute enough is made a dead zone, and it may be configured that the basic speed command Vjs_x in the X-axis direction is set to zero for the swing amount within the dead zone.

Also, out of the basic speed command Vjs_xy, the basic speed command Vjs_y in the Y-axis direction is determined according to the transverse moving command. More specifically, when the swing amount of the joy stick 12 shown by the transverse moving command is a swing amount toward the right, the basic speed command Vjs_y in the Y-axis direction is made the speed command toward the right of the vehicle 1, and, when the swing amount of the joy stick 12 is a swing amount toward the left side, the basic speed command Vjs_y in the Y-axis direction is made the speed command toward the left of the vehicle 1. In this case, the magnitude of the basic speed command Vjs_y in the Y-axis direction is determined so as to increase in the range of a predetermined upper limit value or below as the swing amount of the joy stick 12 toward the right or toward the left increases.

Further, with respect to the magnitude of the basic speed command Vjs_y, a predetermined range where the swing amount of the joy stick 12 toward the right or toward the left becomes minute enough is made a dead zone, and it may be configured that the basic speed command Vjs_y in the Y-axis direction is set to zero for the swing amount within the dead zone.

Also, when the joy stick 12 is operated in both of the front/rear direction (X-axis direction) and the right/left direction (Y-axis direction), the magnitude of the basic speed command Vjs_y in the Y-axis direction may be changed according to the swing amount of the joy stick 12 in the front/rear direction or the basic speed command Vjs_x in the X-axis direction.

The gravity center speed estimation unit 33 calculates an estimate value Vb_estm1_xy of the speed of the vehicle system center of gravity of the entirety based on a geometric (kinematic) relation formula expressed by the expressions (1a), (2a) in the inverted pendulum model.

More specifically, as shown in the block diagram of FIG. 5, the estimate value Vb_estm1_xy of the speed of the vehicle system center of gravity of the entirety is calculated by adding a value of the actual translational speed Vw1_act_xy of the first moving motion unit 3 and a value obtained by multiplying the actual temporal change rate ωb_act_xy of the inclination angle θb_xy (inclination angular velocity) of the occupant riding section 5 by the height h of the vehicle system center of gravity of the entirety.

That is, the estimate value Vb_estm1_x of the speed in the X-axis direction and the estimate value Vb_estm1_y of the speed in the Y-axis direction of the vehicle system center of gravity of the entirety are calculated respectively by expressions (3a), (3b) below.

$$Vb\_estm1\_x = Vw1\_act\_x + h \cdot \omega b\_act\_x \quad (3a)$$

$$Vb\_estm1\_y = Vw1\_act\_y + h \cdot \omega b\_act\_y \quad (3b)$$

However, the temporal change rate of the shift amount Ofst_xy of the position of the vehicle system center of gravity of the entirety from the position of the reference Ps_xy (hereinafter referred to as a gravity center shift amount Ofst_xy) was assumed to be small enough compared to Vb_estm1_xy and negligible.

In this case, for the values of Vw1_act_x, Vw1_act_y in the calculation above, in the present embodiment, target values Vw1_cmd_x, Vw1_cmd_y (values of the last time) of the moving speed of the first moving motion unit 3 determined by the attitude control calculation unit 34 at the last calculation processing period are used.

However, it may be configured for example that each rotational speed of the electric motors 8a, 8b is detected by a rotational speed sensor such as a rotary encoder and the like and newest values of Vw1_act_x, Vw1_act_y estimated from these estimate values (in other words, newest values of the measured values of Vw1_act_x, Vw1_act_y) are used for calculation of the expressions (3a), (3b).

Also, for the values of ωb_act_x, ωb_act_y, in the present embodiment, the newest values of the temporal change rate of the measured value of the inclination angle θb of the occupant riding section 5 based on the detection signal of the inclination sensor 22 (in other words, newest values of the measured values of ωb_act_x, ωb_act_y) are used.

The first control processing unit 24 determines a gravity center shift amount estimate value Ofst_estm_xy that is the estimate value of the gravity center shift amount Ofst_xy by executing processing of the operation command conversion unit 31 and the gravity center speed estimation unit 33 as described above and thereafter executing processing of a gravity center shift estimation unit 35a shown in FIG. 5.

Figure 8:
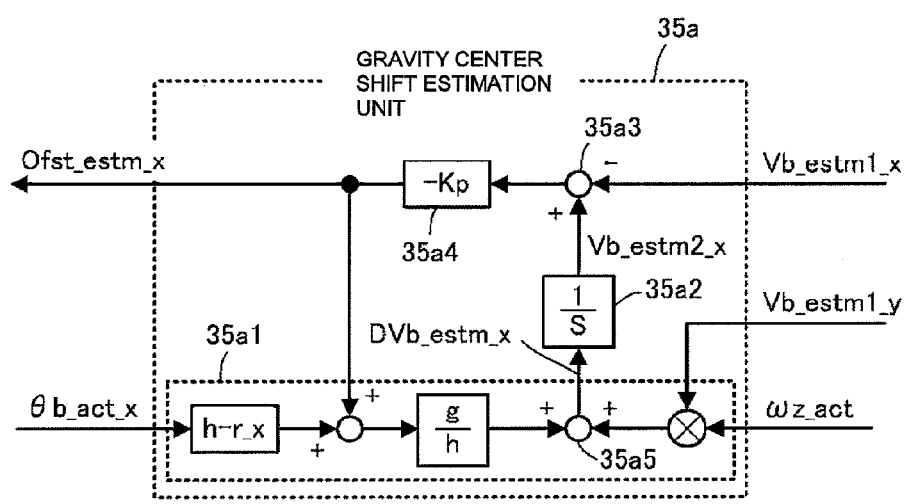
FIG. 8 is a block diagram showing processing of the gravity center shift estimation unit shown in FIG. 5.

Processing of this gravity center shift estimation unit 35a is processing shown by the block diagram of FIG. 8. Also, FIG. 8 representatively expresses determination processing of the gravity center shift amount estimate value Ofst_estm_x in the X-axis direction out of the gravity center shift amount estimate value Ofst_estm_xy. Further, in the description below, the estimate values Vb_estm1_x, Vb_estm1_y of the speed of the vehicle system center of gravity of the entirety calculated by the gravity center speed estimation unit 33 may be referred to as the first estimate values Vb_estm1_x, Vb_estm1_y, respectively.

Processing of FIG. 8 will be described specifically. The gravity center shift estimation unit 35a calculates the estimate value DVb_estm_x of the translational acceleration in the X-axis direction of the vehicle system center of gravity of the entirety by executing calculation processing of the right side of the expression (1b) by a calculation unit 35a1 using the measured value (newest value) of the actual inclination angle θb_act_x of the occupant riding section 5 in the direction around Y-axis obtained from the detection signal of the inclination sensor 22, the measured value (newest value) of the actual Yaw rate ωz_act of the vehicle 1 obtained from the detection signal of the yaw rate sensor 23, the first estimate value Vb_estm1_y (newest value) of the speed of the vehicle system center of gravity of the entirety in the Y-axis direction calculated by the gravity center speed estimation unit 33, and the gravity center shift amount estimate value Ofst_estm_x (the value of the last time) in the X-axis direction determined at the calculation processing period of the last time.

Also the gravity center shift estimation unit 35a calculates the second estimate value Vb_estm2_x of the speed of the vehicle system center of gravity of the entirety in the X axis direction by executing processing of integrating the estimate value DVb_estm_x of the translational acceleration in the X-axis direction of the vehicle system center of gravity of the entirety by a calculation unit 35a2.

Next, the gravity center shift estimation unit 35a executes processing of calculating the deviation of the second estimate value Vb_estm2_x (newest value) of the speed of the vehicle system center of gravity of the entirety in the X-axis direction and the first estimate value Vb_estm1_x (the newest value) by a calculation unit 35a3.

Further, the gravity center shift estimation unit 35a determines the newest value of the gravity center shift amount estimate value Ofst_estm_x in the X-axis direction by executing processing of multiplying this deviation by a predetermined gain (−Kp) by a calculation unit 35a4.

Determining processing of the gravity center shift amount estimate value Ofst_estm_y in the Y-axis direction is also executed similarly to the above. More specifically, the block diagram that shows this determining processing is obtained by replacing the suffixes "_x" and "_y" in FIG. 7 with each other and substituting "−" for the marks "+" of the acceleration component (the acceleration component generated by the centrifugal force) on the right side in the drawing that is one of the inputs to an adder 35a5.

By such processing of the gravity center shift estimation unit 35a, Ofst_estm_xy can be determined so as to converge to an actual value by determining the gravity center shift amount estimate value Ofst_estm_xy while updating it one by one.

Next, the first control processing unit 24 calculates the gravity center shift effect amount Vofs_xy by executing processing of a gravity center shift effect amount calculation unit 35b shown in FIG. 5.

The gravity center shift effect amount Vofs_xy expresses the shift of the actual gravity center speed with respect to the target speed of the vehicle system center of gravity of the entirety when feedback-control is executed in the attitude control calculation unit 34 described below without taking that the position of the vehicle system center of gravity of the entirety shifts from the position of the reference Ps_xy in the inverted pendulum model into consideration.

More specifically, this gravity center shift effect amount calculation unit 35b calculates the gravity center shift effect amount Vofs_xy by multiplying each component of the newly determined gravity center shift amount estimate value Ofst_estm_xy by a value of (Kth_xy/(h−r_xy))/Kvb_xy.

Also, Kth_xy is a gain value for determining a manipulated variable component that functions so as to bring the inclination angle of the occupant riding section 5 close to zero (target inclination angle) in processing of the attitude control calculation unit 34 described below. Further, Kvb_xy is a gain value for determining a manipulated variable component that functions so as to bring the deviation of the target speed Vb_cmd_xy of the vehicle system center of gravity of the entirety and the first estimate value Vb_estm1_xy of the speed of the vehicle system center of gravity of the entirety close to zero in processing of the attitude control calculation unit 34 described below.

Next, the first control processing unit 24 calculates a post-restriction gravity center target speed Vb_cmd_xy based on the basic speed command Vjs_xy determined by the operation command conversion unit 31 and the gravity center shift effect amount Vofs_xy determined by the gravity center shift effect amount calculation unit 35b by executing processing of the gravity center target speed determination unit 32 shown in FIG. 4.

First, the gravity center target speed determination unit 32 executes processing of a processing unit 32c shown in FIG. 4. This processing unit 32c determines a target gravity center speed adding amount Vb_cmd_by_ofs_xy as a component according to the shift of the gravity center out of the target value of the speed of the vehicle system center of gravity of the entirety by executing dead zone processing and limiting processing in relation with the value of the gravity center shift effect amount Vofs_xy.

More specifically, in the present embodiment, when the magnitude of the gravity center shift effect amount Vofs_xy in the X-axis direction is a value within the dead zone that is a predetermined range in the vicinity of zero (a value comparatively near to zero), the gravity center target speed determination unit 32 makes the target gravity center speed adding amount Vb_cmd_by_ofs_xy in the X-axis direction zero.

Also, when the magnitude of the gravity center shift effect amount Vofs_x in the X-axis direction is a value deviated from the dead zone, the gravity center target speed determination unit 32 determines the target gravity center speed adding amount Vb_cmd_by_ofs_x in the X-axis direction to be of a polarity same as that of Vofs_x and so that the magnitude thereof increases as the magnitude of Vofs_x increases. However, the value of the target gravity center speed adding amount Vb_cmd_by_ofs_x is restricted to the range between predetermined upper limit value (>0) and lower limit value (≤0).

The determining process of the target gravity center speed adding amount Vb_cmd_by_ofs_y in the Y-axis direction is also similar to the above.

Next, the gravity center target speed determination unit 32 executes processing for determining the target speed V1_xy that is obtained by adding each component of the target gravity center speed adding amount Vb_cmd_by_ofs_xy to each component of the basic speed command Vjs_xy which is determined by the operation command conversion unit 31 by a processing unit 32d shown in FIG. 5. That is, V1_xy (a set of V1_x and V1_y) is determined by processing of V1_x=Vjs_x+Vb_cmd_by_ofs_x, V1_y=Vjs_y+Vb_cmd_by_ofs_y.

Further, the gravity center target speed determination unit 32 executes processing of a processing unit 32e. This processing unit 32e executes limiting processing for determining the post-restriction gravity center target speed Vb_cmd_xy (a set of Vb_cmd_x and Vb_cmd_y) as the target speed of the vehicle system center of gravity of the entirety obtained by restricting combination of the target speed V1_x and V1_y in order that each rotational speed of the electric motor 8a, 8b as the actuator device 8 of the first moving motion unit 3 does not deviate from a predetermined allowable range.

In this case, when a set of the target speeds V1_x and V1_y obtained by the processing unit 32d exists within a predetermined region on a coordination system with the value of the target speed V1_x on the axis of ordinates and with the value of the target speed V1_y on the axis of abscissas (the region of the octagonal shape for example), the target speed V1_xy is determined as the post-restriction gravity center target speed Vb_cmd_xy as it is.

Also when a set of the target speeds V1_x and V1_y obtained by the processing unit 32d deviates from the predetermined region on the coordination system, one restricted to a set on the boundary of the predetermined region is determined as the post-restriction gravity center target speed Vb_cmd_xy.

As described above, because the gravity center target speed Vb_cmd_xy is determined based on the basic speed command Vjs_xy and the gravity center shift effect amount Vofs_xy (or the gravity center shift amount), the occupant can steer the vehicle 1 by operation of the controller (operation of the joy stick 12) and by change of the attitude of the body of the occupant (movement of the body weight).

After executing processing of the gravity center target speed determination unit 32 as described above, next, the first control processing unit 24 executes processing of the attitude control calculation unit 34. The attitude control calculation unit 34 determines the first target speed Vw1_cmd_xy that is the target value of the moving speed (translational speed) of the first moving motion unit 3 by processing shown in the block diagram of FIG. 5.

More specifically, first, the attitude control calculation unit 34 determines the target speed after gravity center shift compensation Vb_cmpn_cmd_xy (newest value) by executing processing of reducing each component of the gravity center shift effect amount Vofs_xy by a calculation unit 34b from each component of the post-restriction gravity center target speed Vb_cmd_xy.

Next, the attitude control calculation unit 34 calculates the target translational acceleration DVw1_cmd_x in the X-axis direction and the target translational acceleration DVw1_cmd_y in the Y-axis direction out of the target translational acceleration DVw1_cmd_xy that is the target value of the translational acceleration of the grounding point of the first moving motion unit 3 by processing of the calculation unit 34b and the calculation units excluding an integration calculation unit 34a that executes integration calculation by calculation of expressions (4a), (4b) below, respectively.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

Kvb_xy, Kth_xy, Kw_xy in the expressions (4a), (4b) are predetermined gain values that are set beforehand.

Also, the first term on the right side of the expression (4a) is a feedback manipulated variable component according to the deviation of the target speed after gravity center shift compensation Vb_cmpn_cmd_x (newest value) in the X-axis direction of the vehicle system center of gravity of the entirety and the first estimate value Vb_estm1_x (newest value), the second term is a feedback manipulated variable component according to the measured value (newest value) of the actual inclination angle θb_act_x in the direction around Y-axis of the occupant riding section 5, and the third term is a feedback manipulated variable component according to the measured value (newest value) of the actual inclination angular velocity ωb_act_x in the direction around Y-axis of the occupant riding section 5. Further, the target translational acceleration DVw1_cmd_x in the X-axis direction is calculated as a combined manipulated variable of these feedback manipulated variable components.

Similarly, the first term of the right side of the expression (4b) is a feedback manipulated variable component according to the deviation of the target speed after gravity center shift compensation Vb_cmpn_cmd_y (newest value) in the Y-axis direction of the vehicle system center of gravity of the entirety and the first estimate value Vb_estm1_y (newest value), the second term is a feedback manipulated variable component according to the measured value (newest value) of the actual inclination angle θb_act_y in the direction around X-axis of the occupant riding section 5, and the third term is a feedback manipulated variable component according to the measured value (newest value) of the actual inclination angular velocity ωb_act_y in the direction around X-axis of the occupant riding section 5. Further, the target translational acceleration DVw1_cmd_y in the Y-axis direction is calculated as a combined manipulated variable of these feedback manipulated variable components.

Next, the attitude control calculation unit 34 determines the first target speed Vw1_cmd_xy (newest value) of the first moving motion unit 3 by integrating each component of the target translational acceleration DVw1_cmd_xy by the integration calculation unit 34a.

Also, the first control processing unit 24 controls the electric motors 8a, 8b as the actuator device 8 of the first moving motion unit 3 according to the first target speed Vw1_cmd_xy determined as described above. More specifically, the first control processing unit 24 determines the current command value of the each electric motor 8a, 8b by feedback control processing so that actual rotational speed (measured value) follows up the target value of the rotational speed of the each electric motor 8a, 8b decided by the first target speed Vw1_cmd_xy, and executes energization of the each electric motor 8a, 8b according to this current command value.

By processing as described above, in a state where the post-restriction gravity center target speed Vb_cmd_xy is a constant value, the motion of the vehicle 1 is settled, and the vehicle 1 is moving straight at a constant speed, the vehicle system center of gravity of the entirety exists just above the grounding point of the first moving motion unit 3. In this state, the actual inclination angle θb_act_xy of the occupant riding section 5 becomes −Ofst_xy/(h−r_xy) based on the expressions (1b), (2b). Also, the actual inclination angular velocity ωb_act_xy of the occupant riding section 5 becomes zero, and the target translational acceleration DVw1_cmd_xy becomes zero. From this fact and the block diagram of FIG. 5, agreement of Vb_estm1_xy and Vb_cmd_xy is derived.

More specifically, the first target speed Vw1_cmd_xy of the first moving motion unit 3 is basically determined so that the deviation of the post-restriction gravity center target speed Vb_cmd_xy and the first estimate value Vb_estm1_xy of the vehicle system center of gravity of the entirety converges to zero.

Also, each rotational speed of the electric motor 8a, 8b as the actuator device 8 of the first moving motion unit 3 is controlled so as not to deviate from a predetermined allowable range by processing of the processing unit 32e while compensating the effect of the event that the position of the vehicle system center of gravity of the entirety shifts from the position of the reference Ps_xy in the inverted pendulum model.

In addition, because Vb_cmpn_cmd_x=Vb_cmd_x−Vofs_x=Vb_cmd_x−(Kth_x/h−r_x)·(1/Kvb_x)·Ofst_estm_x and Vb_cmpn_cmd_y=Vb_cmd_y−Vofs_y=Vb_cmd_y−(Kth_y/h−r_y)·(1/Kvb_y)·Ofst_estm_y in the expressions (4a), (4b), the expressions (4a), (4b) can be rewritten to expressions (4a)′, (4b)′ below, respectively.

$$DVw1\_cmd\_x = Kvb\_x \cdot (Vb\_cmd\_x - Vb\_estm1\_x) - \\ Kth\_x \cdot (Ofst\_estm\_x/(h - r\_x) + \theta b\_act\_x) - Kw\_x \cdot \omega b\_act\_x \quad (4a)'$$

$$DVw1\_cmd\_y = Kvb\_y \cdot (Vb\_cmd\_y - Vb\_estm1\_y) - \\ Kth\_y \cdot (Ofst\_estm\_y/(h - r\_y) + \theta b\_act\_y) - Kw\_y \cdot \omega b\_act\_y \quad (4b)'$$

In this case, the second term of the right side of the expressions (4a)', (4b)' has the meaning as the feedback manipulated variable component for bringing the actual position of the vehicle system center of gravity of the entirety in the X-axis direction and the Y-axis direction to the position just above the grounding part of the first moving motion unit 3.

Above is the detail of processing of the first control processing unit 24 in the present embodiment.

Next, processing of the second control processing unit 25 will be described referring to FIG. 9. Roughly speaking on processing thereof, the second control processing unit 25 determines presence/absence of the request for turning the vehicle 1 (hereinafter referred to as a turning request) or the degree of the turning request based on the actual motion state in the Y-axis direction (the right/left direction of the occupant) of the representative point of the vehicle 1 such as the vehicle system center of gravity of the entirety or the first moving motion unit 3 or the motion state of the target, or the action state of the occupant in relation with the motion states.

In the present embodiment, as an indicator for determining presence/absence of the turning request or the degree of the turning request, the estimate value Vb_estm1_y of the moving speed in the Y-axis direction of the vehicle system center of gravity of the entirety calculated by the gravity center speed estimation unit 33 is used. Also, because Vb_estm1_y agrees to the moving speed in the Y-axis direction of the reference Ps_y, it has the meaning as the observed value of the moving speed in the Y-axis direction of the representative point fixed with respect to the occupant riding section 5 (or the base 2).

Also, when it is determined that there is a turning request, in order to turn the vehicle 1, the second control processing unit 25 determines a manipulated variable (control input) for controlling a brake force of the control device 18. In the present embodiment, as the manipulated variable, a target value ΔVw2_cmd_y of the relative moving speed in the Y-axis direction of the second moving motion unit 4 with respect to the first moving motion unit 3 is determined.

Such processing of the second control processing unit 25 is executed specifically as described below. More specifically, with reference to FIG. 8, first, the second control processing unit 25 executes processing of a processing unit 41. To the processing unit 41, the estimate value Vb_estm1_y (newest value) of the moving speed in the Y-axis direction of the vehicle system center of gravity of the entirety calculated by the gravity center speed estimation unit 33 is inputted. Also, the processing unit 41 determines the speed after dead zone processing Vw1a_y according to Vb_estm1_y.

When the occupant of the vehicle 1 intends to turn the vehicle 1 to the right or left, the occupant normally tries to shift the gravity center of himself or herself to the right or left of the vehicle 1 by tilting the upper body of the occupant himself or herself to the right or left. At this time, the first target speed Vw1_cmd_y in the right/left direction of the first moving motion unit 3 determined by control processing of the first control processing unit 24 basically becomes the moving speed to the right or to the left.

However, even when the occupant does not intend to turn the vehicle 1, the gravity center of the occupant himself or herself may possibly shift to the right or left to some extent by the drift of the upper body of the occupant.

Figure 9:
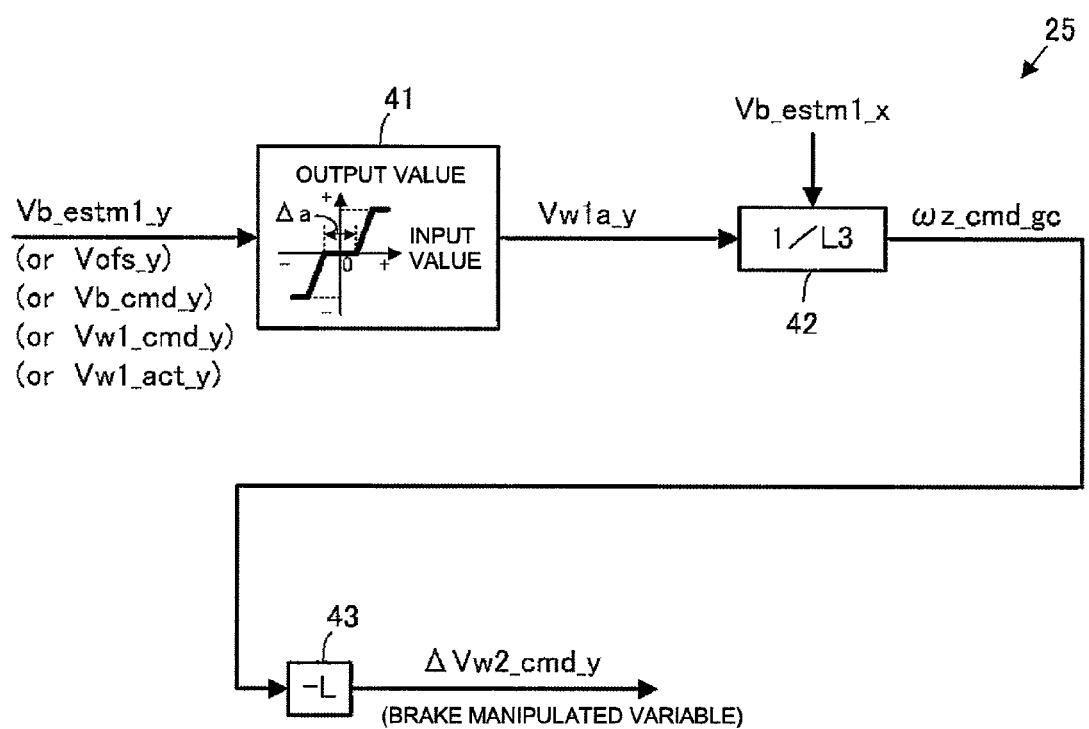
FIG. 9 is a block diagram showing processing of the second control processing unit shown in FIG. 4.

Therefore, by the characteristic of the graph shown in FIG. 9, the processing unit 41 determines the speed after dead zone processing Vw1a_y according to Vb_estm1_y. More specifically, when the absolute value of Vb_estm1_y is comparatively small and Vb_estm1_y is a value within a predetermined range Δa with zero taken in the center (when the absolute value of Vb_estm1_y is equal to or less than a predetermined value determined beforehand), the processing unit 41 deems that there is no turning request, and makes Vw1a_y zero.

Also, when the absolute value of Vb_estm1_y is comparatively large and Vb_estm1_y is a value out of the predetermined range Δa (when the absolute value of Vb_estm1_y is larger than the predetermined value determined beforehand), the processing unit 41 deems that there is a turning request, and sets Vw1a_y to a value that is not zero.

More specifically, the processing unit 41 determines Vw1a_y according to Vb_estm1_y so that the absolute value of Vw1a_y increases accompanying an increase of the absolute value of Vb_estm1_y in the range of a predetermined upper limit value or less. In this case, the polarity (direction) of Vw1a_y is made the same as that of Vb_estm1_y. As described below, in order to set the center of turning to a preferable position, the increase ratio of the absolute value of Vw1a_y with respect to an increase of the absolute value of Vb_estm1_y is preferable to be 1. More specifically, in a region excluding the dead zone and the saturate region in the graph of FIG. 9, the inclination is preferable to be 1.

Also, in FIG. 9, the reference signs in parentheses on the input side of the processing unit 41 relate to the modifications described below.

Next, the second control processing unit 25 executes processing of a processing unit 42. This processing unit 42 determines the target turning angular velocity ωz_cmd_gc that is the target value of the turning angular velocity (the angular velocity in the direction around the yaw axis) of the vehicle 1 by dividing Vw1a_y by distance L3 in the X-axis direction between the grounding part of the first moving motion unit 3 and the center of turning. In this case, the processing unit 42 sets the distance L3 according to the estimate value Vb_estm1_x (newest value) of the actual moving speed in the X-axis direction of the vehicle system center of gravity of the entirety as the representative point of the vehicle 1.

Also, more specifically, the center of turning means the center of rotation in the direction around the yaw axis of the entirety of the vehicle 1 as viewed on the coordinate system that translationally moves on the floor surface integrally with the first moving motion unit 3.

In the present embodiment, turning of the vehicle 1 is executed in the direction around the yaw axis with a point on the floor surface on the rear side of the grounding part of the first moving motion unit 3 (the rear side of the occupant riding on the occupant riding section 5) being the center of turning. Also, when Vb_estm1_x is zero, the distance L3 in the X-axis direction between the center of turning and the grounding part of the first moving motion unit 3 is set so that the center of turning comes to a position in the vicinity of the grounding part of the second moving motion unit 4. For example, L3 is set so as to agree or generally agree to the distance between the grounding part of the first moving motion unit 3 and the grounding part of the second moving motion unit 4.

When Vb_estm1_x is positive which is the case when moving forward, L3 is set so that the center of turning approaches the grounding part side of the first moving motion unit 3 from the grounding part side of the second moving motion unit 4 (so that the position in the X-axis direction of the center of turning approaches the position just below the occupant riding on the occupant riding section 5 (the position where the occupant is projected to the floor surface)) as the magnitude (absolute value) of Vb_estm1_x increases. That is, L3 is set so as to reduce as the magnitude (absolute value) of Vb_estm1_x increases. However, L3 is restricted to a distance of a predetermined lower limit value (>0) or more.

When Vb_estm1_x is negative which is the case of moving rearwardly, L3 is preferable to be set to be the same as a value of a case where Vb_estm1_x is zero, or to increase as the magnitude (absolute value) of Vb_estm1_x increases.

The processing unit 42 determines the target turning angular velocity ωz_cmd_gc by dividing Vw1a_y by the distance L3 that is determined thus according to Vb_estm1_x. Also, ωz_cmd_gc is the angular velocity of the left turn (counterclockwise) when Vw1a_y is the leftward velocity, and is the angular velocity of the right turn (clockwise) when Vw1a_y is the rightward velocity.

Next, the second control processing unit 25 executes processing of a processing unit 43. The processing unit 43 calculates the relative moving speed ΔVw2_cmd_y in the Y-axis direction of the second moving motion unit 4 with respect to the first moving motion unit 3 in a case where the vehicle 1 turns at the target turning angular velocity ωz_cmd_gc by multiplying the target turning angular velocity ωz_cmd_gc determined by the processing unit 42 by a value (=−L) of (−1) times of a predetermined distance between the grounding part of the first moving motion unit 3 and the grounding part of the second moving motion unit 4.

In a case of ωz_cmd_gc=0 (in a case where there is no turning request), the relative moving speed ΔVw2_cmd_y in the Y-axis direction of the second moving motion unit 4 thus determined becomes zero. Also, ΔVw2 cmd_y is the rightward velocity when ωz_cmd_gc is the turning angular velocity of the left turn, and is the leftward velocity when ωz_cmd_gc is the turning angular velocity of the right turn. Therefore, ΔVw2_cmd_y in a case where there is a turning request is the velocity of the direction opposite to that of Vw1a_y or Vb_estm1_y.

As described above, the second control processing unit 25 determines the target relative moving speed ΔVw2_cmd_y in the Y-axis direction of the second moving motion unit 4 as the manipulated variable of the brake device 18. Also, the second control processing unit 25 controls the brake device 18 according to this target relative moving speed ΔVw2_cmd_y.

More specifically, when ΔVw2_cmd_y is zero (when there is no turning request), the second control processing unit 25 does not drive the caliper 82 by the brake actuator 83, and maintains a state where the brake device 18 does not generate a brake force.

Also, when ΔVw2_cmd_y is not zero (when there is a turning request), the second control processing unit 25 makes the caliper 82 sandwich the brake disk 81 by driving the caliper 82 by the brake actuator 83 of the brake device 18. Thereby, rotation of the brake disk 81 and the annular core body 13 of the second moving motion unit 4 is braked by a friction force, and a brake force that brakes movement in the Y-axis direction of the second moving motion unit 4 is generated.

In this case, the second control processing unit 25 controls a drive force of the caliper 82 by the brake actuator 83 so that the sandwiching force of the brake disk 81 by the caliper 82 and the force of braking movement in the Y-axis direction of the second moving motion unit 4 increase as the absolute value of ΔVw2_cmd_y is larger.

Control processing of the second control processing unit 25 is executed as described above. In this case, in a situation where the absolute value of the estimate value Vb_estm1_y of the moving speed in the Y-axis direction of the vehicle system center of gravity of the entirety is small enough and it is determined that there is no turning request, the brake device 18 is in a state of not generating a brake force.

Also, in a situation when the absolute value of the estimate value Vb_estm1_y of the moving speed in the Y-axis direction of the vehicle system center of gravity of the entirety is comparatively large and it is determined that there is a turning request, the brake device 18 is controlled so as to generate a brake force that brakes movement in the Y-axis direction (the right/left direction) of the second moving motion unit 4. Further, the brake force is controlled so as to increase as the absolute value of the target relative moving speed ΔVw1_cmd_y in the Y-axis direction of the second moving motion unit 4 for turning the vehicle 1 is larger (in other words, as the absolute value of the target turning angular velocity ωz_cmd_gc is larger).

In the vehicle 1 of the present embodiment described above, translational movement of the vehicle 1 in the X-axis direction can be executed according to tilting in the front/rear direction (the X-axis direction) of the occupant riding section 5 (or the base 2) accompanying movement of the body of the occupant riding on the occupant riding section 5, or according to the advancing/retreating command outputted according to the swing operation in the front/rear direction of the joy stick 12.

Also, under such a situation wherein the movement in the right/left direction of the gravity center of the occupant himself or herself riding on the occupant riding section 5 (relative movement with respect to the occupant riding section 5) is comparatively small and the estimate value Vb_estm1_y of the moving speed in the Y-axis direction of the vehicle system center of gravity of the entirety falls within a predetermined range Δa in the vicinity of zero, translational movement of the vehicle 1 the Y-axis direction can be executed according to minute tilting in the right/left direction (the Y-axis direction) of the occupant riding section 5 (or the base 2), or according to the transverse movement command outputted according to the swing operation in the right/left direction of the joy stick 12.

Further, combining these translational movements, translational movement of the vehicle 1 can be executed also in an optional direction oblique with respect to the X-axis direction and the Y-axis direction.

Figure 10A:
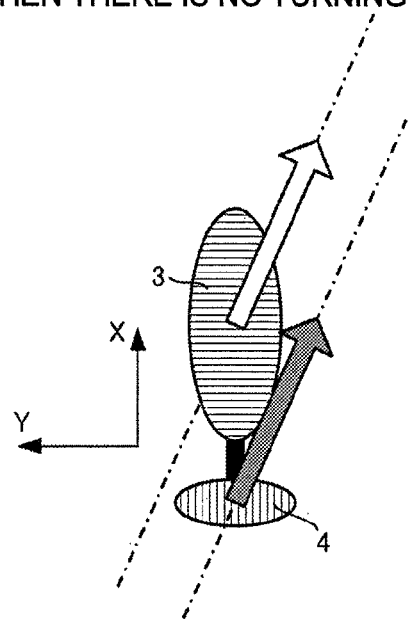
FIGS. 10(a) and 10(b) are drawings schematically showing the behavior in translational movement and the behavior in the turning motion of the inverted pendulum type vehicle of the first embodiment, respectively.

Because the brake device 18 does not generate a brake force at the time of such translational movement of the vehicle 1, the second moving motion unit 4 is in a state freely movable in the X-axis direction and the Y-axis direction. Therefore, as schematically shown in FIG. 10(*a*), the second moving motion unit 4 comes to move at a moving speed equal or generally equal to that of the first moving motion unit 3 following the translational movement of the first moving motion unit 3.

Also, when the estimate value Vb_estm1_y of the moving speed in the Y-axis direction of the vehicle system center of gravity of the entirety deviates from a predetermined range Δa in the vicinity of zero by that the occupant riding on the occupant riding section 5 moves the gravity center of the occupant himself or herself comparatively largely in the right/left direction (that is, when it is determined that there is a turning request), the brake actuator 83 of the brake device 18 is controlled by the second control processing unit 25 so as to generate a brake force by the caliper 82. Also, at this time, the brake actuator 83 is controlled so that the brake force of the brake device 18 increases as the absolute value of the target relative moving speed ΔVw2 cmd_y in the Y-axis direction of the second moving motion unit 4 is larger (in other words, as the absolute value of the target turning angular velocity ωz_cmd_gc is larger).

Figure 10B:
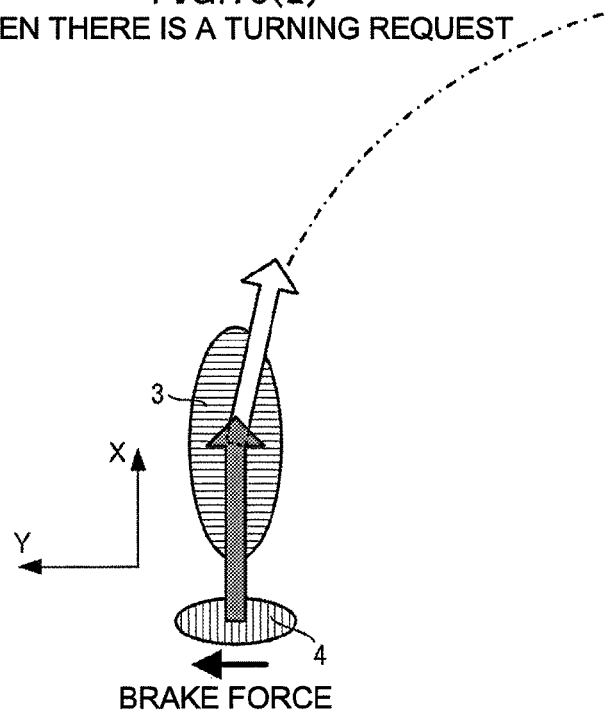

Therefore, the moving speed in the Y-axis direction of the second moving motion unit 4 comes to be controlled to a speed slower than the moving speed in the Y-axis direction of the first moving motion unit 3 (including zero). As a result, as schematically shown in FIG. 10(b), respective moving speeds in the Y-axis direction of the first moving motion unit 3 and the second moving motion unit 4 become different from each other, and the vehicle 1 comes to turn to the same side of the direction of the moving speed in the Y-axis direction of the first moving motion unit 3 (the right side or the left side; the right side in FIG. 10(b)).

Therefore, the occupant can turn the vehicle 1 only by moving the upper body so as to move the gravity center of the occupant himself or herself in the right/left direction. Also, in this case, the vehicle 1 turns to the left when the occupant moves the gravity center of the occupant himself or herself to the left, and the vehicle 1 turns to the right when the occupant moves the gravity center of the occupant himself or herself to the right. Accordingly, the movement of the gravity center of the occupant in the right/left direction and the turning direction of the vehicle 1 conform to each other.

Therefore, the occupant can easily turn the vehicle 1 by movement in the right/left direction of the upper body of the occupant himself or herself, and can easily master the steering operation for turning the vehicle 1.

Also, for example, when the vehicle 1 is to be turned (direction change) in a stop state of the vehicle 1 (the state in which movement of the first moving motion unit 3 and the second moving motion unit 4 almost stops), the first moving motion unit 3 that supports the weight of the occupant and the weight of the major part of the vehicle 1 comes to move in the right/left direction (the Y-axis direction), and therefore a large friction force can be prevented from applying to the first moving motion unit 3. Accordingly, turning (direction change) of the vehicle 1 can be executed smoothly.

Also, when the vehicle 1 is to be turned while the vehicle 1 is moved to the forward direction (the positive direction of X-axis), as the magnitude (absolute value) of the estimate value Vb_estm1_x of the moving speed in the X-axis direction of the vehicle system center of gravity of the entirety as a representative point of the vehicle 1 is larger, the distance L3 between the grounding part of the first moving motion unit 3 and the center of turning becomes smaller, and therefore the occupant can easily make the movement trajectory in turning of the vehicle 1 line with a desired trajectory.

Further, because turning of the vehicle 1 is executed by making the brake device 18 generate a brake force that brakes movement in the Y-axis direction of the second moving motion unit 4, speed control of the second moving motion unit 4 (speed control for feedback-controlling the actual moving speed to a target value) is not required. Also, by adjusting the magnitude of the brake force, the turning angular velocity and the turning radius of the vehicle 1 can be controlled.

Therefore, the brake device 18 can be formed at a low cost, and turning of the vehicle 1 can be executed appropriately by a simple control.

Also, in the present embodiment, the gravity center shift estimation unit 35a of the first control processing unit 24 estimates the gravity center shift amount Ofst_xy of the vehicle system center of gravity of the entirety by processing shown in FIG. 8. Therefore, the gravity center shift amount can be estimated accurately. Also, as described above, according to the estimate value Ofst_estm_xy of this gravity center shift amount Ofst_xy, the target speed (post-restriction gravity center target speed) Vb_cmd_xy of the vehicle system center of gravity of the entirety is determined. Therefore, the effect exerted to the behavior of the vehicle 1 by the gravity center shift amount Ofst_xy can be properly compensated.

Also, in the vehicle 1 of the present embodiment, because the swing amount (the swing amount around Y-axis) of the second moving motion unit 4 with respect to the base 2 is mechanically restricted within a predetermined range defined by the stoppers 17, 17, the occupant riding section 5 can be prevented from tilting excessively to the rear side in particular.

Next, the second embodiment and the third embodiment of the present invention will be described respectively referring to FIG. 11(a), FIG. 11(b). Also, the second embodiment and the third embodiment are different from the first embodiment with respect to only a part of processing of the second control processing unit 25. Therefore, in description of the second embodiment and the third embodiment, description of items same as those of the first embodiment will be omitted.

Also, in FIGS. 11(a), 11(b), the reference signs in parentheses relate to the modifications described below.

Figure 11A:
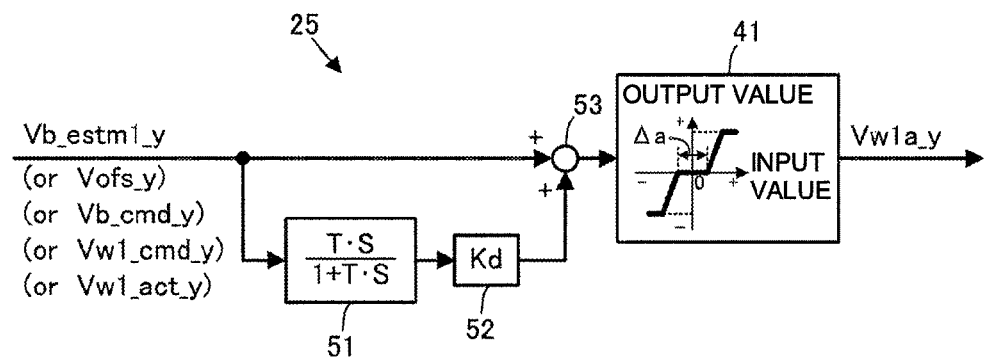
FIGS. 11(a) and 11(b) are block diagrams showing processing of an essential part of the second control processing unit in the second embodiment and the third embodiment of the present invention, respectively.

FIG. 11(a) shows processing in which the second control processing unit 25 determines Vw1a_y (the target value of the speed after dead zone processing) according to the estimate value Vb_estm1_y of the moving speed in the Y-axis direction of the vehicle system center of gravity of the entirety in the second embodiment.

In this second embodiment, the second control processing unit 25 includes a low-cut filter (pseudo-differentiation filter) 51 to which the estimate value Vb_estm1_y of the moving speed in the Y-axis direction of the vehicle system center of gravity of the entirety is inputted. The second control processing unit 25 adds a value obtained by multiplying the output of the low-cut filter 51 (a value obtained by subjecting Vb_estm1_y to filtering processing of a low-cut characteristic) by the gain Kd of a predetermined value by a processing unit 52 to Vb_estm1_y by a calculation unit 53.

Also, the second control processing unit 25 inputs the output of the calculation unit 53 to the processing unit 41 the same as that of the first embodiment instead of inputting Vb_estm1_y, executes processing of the processing unit 41 in a similar manner as done in the first embodiment, and thereby determines Vw1a_y. That is, Vw1a_y is equivalent to one obtained by passing Vb_estm1_y through a phase compensation circuit (filter).

The second embodiment is the same as the first embodiment with respect to the items other than those described above.

In such second embodiment, Vw1a_y and the target turning angular velocity ωz_cmd_gc are determined according to the phase compensation value of the estimate value Vb_estm1_y of the moving speed in the Y-axis direction of the vehicle system center of gravity of the entirety (the output of the calculation unit 53) and the output of the low-cut filter 51 which becomes one according to the temporal change rate thereof.

Therefore, the response of the turning behavior of the vehicle 1 can be improved with respect to movement in the Y-axis direction of the vehicle system center of gravity of the entirety accompanying movement of the upper body of the occupant.

Figure 11B:
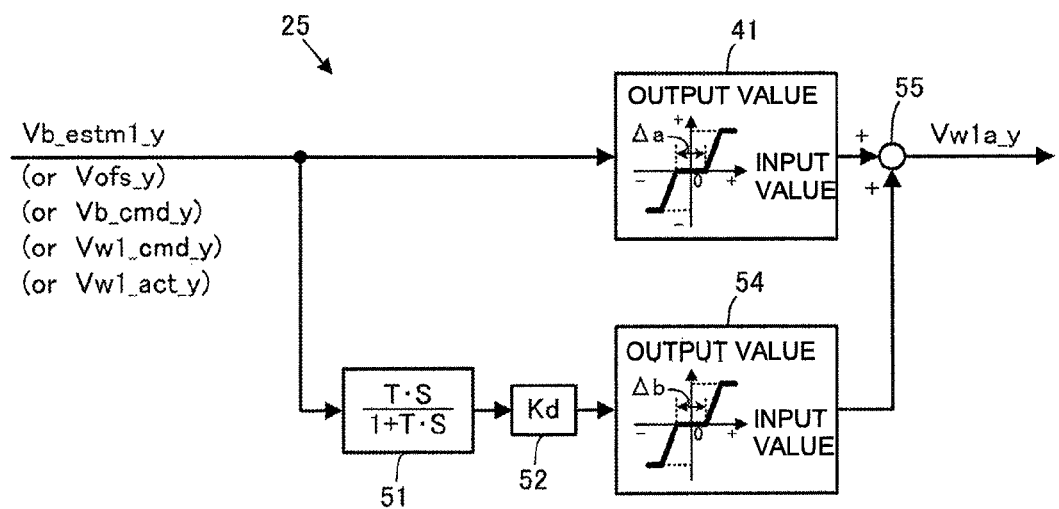

Next, FIG. 11(b) shows processing in which the second control processing unit 25 determines Vw1a_y (the target value of the speed after dead zone processing) according to the estimate value Vb_estm1_y of the moving speed in the Y-axis direction of the vehicle system center of gravity of the entirety in the third embodiment.

In this third embodiment, similarly to the first embodiment, the estimate value Vb_estm1_y of the moving speed in the Y-axis direction of the vehicle system center of gravity of the entirety is configured to be inputted to the processing unit 41.

Also, in the third embodiment, in addition to including the low-cut filter 51 and the processing unit 52 which are the same as those of the second embodiment, the second control processing unit 25 further includes a processing unit 54 that inputs the output of the processing unit 52. This processing unit 54 executes processing similar to that of the processing unit 41.

More specifically, when the absolute value of the input value of the processing unit 54 is comparatively small and the input value is a value within a predetermined range Δb with zero taken in the center (when the absolute value of the input value is equal to or less than a predetermined value determined beforehand), the processing unit 54 makes the output value zero.

Also, when the absolute value of the input value of the processing unit 54 is comparatively large and the input value is a value out of the predetermined range b (when the absolute value of the input value is larger than the predetermined value determined beforehand), the processing unit 54 sets the output value to a value that is not zero.

More specifically, the processing unit 54 determines the output value according to the input value of the processing unit 54 so that the absolute value of the output value thereof increases accompanying increase of the absolute value of the input value of the processing unit 54 in the range of a predetermined upper limit value or less. In this case, the polarity (direction) of the output value of the processing unit 54 is made same as that of the input value.

Also, the second control processing unit 25 in the third embodiment determines Vw1a_y by adding the output value of the processing unit 41 and the output value of the processing unit 54 by a calculation unit 55.

The third embodiment is the same as the first embodiment with respect to the items other than those described above.

In the third embodiment, Vw1a_y is determined by adding a component determined by the processing unit 41 according to the estimate value Vb_estm1_y of the moving speed in the Y-axis direction of the vehicle system center of gravity of the entirety and a component determined by the processing unit 54 according to the output of the low-cut filter 51 which becomes one according to the temporal change rate of Vb_estm1_y.

Therefore, similarly to the second embodiment, response of the turning behavior of the vehicle 1 can be improved with respect to movement in the Y-axis direction of the vehicle system center of gravity of the entirety accompanying movement of the upper body of the occupant.

Next, some of modifications of the respective embodiments described above will be described.

In the respective embodiments, the target relative moving speed ΔVw2_cmd_y in the Y-axis direction of the second moving motion unit 4 was used as the manipulated variable for controlling the brake device 18, and the brake force generated by the brake device 18 was changed according to the ΔVw2_cmd_y. However, the magnitude of the brake force may be made a predetermined constant value.

Also, the target turning angular velocity ωz_cmd_gc may be used as the manipulated variable for controlling the brake device 18 instead of the target relative moving speed ΔVw2 cmd_y in the Y-axis direction of the second moving motion unit 4, and the brake force generated by the brake device 18 may be changed according to the ωz_cmd_gc.

Further, because an appropriate turning radius or turning angular velocity in the turning motion at the time of advancing of the vehicle 1 is determined in general according to the advancing speed in the X-axis direction of the first moving motion unit 3 or the advancing speed in the X-axis direction of the vehicle system center of gravity of the entirety, when there is a turning request of the vehicle 1, the target turning angular velocity ωz_cmd_gc of the vehicle 1 (or the target relative moving speed ΔVw2_cmd_y in the Y-axis direction of the second moving motion unit 4) may be determined according to the advancing speed in the X-axis direction of the first moving motion unit 3 or the vehicle system center of gravity of the entirety. Or otherwise, the magnitude of the brake force of the brake device 18 may be controlled according to the advancing speed in the X-axis direction of the first moving motion unit 3 or the vehicle system center of gravity of the entirety.

Further, it may be also configured that the grounding load of the second moving motion unit 4 is changeable (for example, a mechanism that changes the compression amount of a spring that generates an energizing force pressing the second moving motion unit 4 to the floor surface by an actuator is provided) and the grounding load of the second moving motion unit 4 is made larger in a case where a brake force is generated by the brake device 18 for turning motion of the vehicle 1 than that in a case where a brake force is not generated by the brake device 18. Further, it may be also configured that the grounding load of the second moving motion unit 4 is increased as the brake force generated by the brake device 18 is larger.

Also, in the respective embodiments, in processing of the second control processing unit 25, as an indicator for determining presence/absence of the turning request or the degree of the turning request, the estimate value Vb_estm1_y of the moving speed in the Y-axis direction of the vehicle system center of gravity of the entirety calculated by the gravity center speed estimation unit 33 was employed. However, as the indicator for determining presence/absence of the turning request or the degree of the turning request, a parameter other than Vb_estm1_y may be employed.

For example, as shown in the reference signs in parentheses of FIG. 9 or FIGS. 11(a) and 11(b), the target turning angular velocity ωz_cmd_gc of the vehicle 1 may be determined by executing processing of the processing units 41, 42 similarly to the embodiments using, instead of Vb_estm1_y, the gravity center shift effect amount Vofs_y in the Y-axis direction (or the gravity center shift amount estimate value Ofst_estm_y) calculated by the gravity center shift effect amount calculation unit 35b of the first control processing unit 24, or the post-restriction gravity center target speed Vb_cmd_y in the Y-axis direction determined by the processing unit 32e, or the first target speed Vw1_cmd_y in the Y-axis direction of the first moving motion unit 3 determined by the attitude control calculation unit 34, or the observed value of the actual moving speed Vw1_act_y in the Y-axis direction of the first moving motion unit 3 (for example, a value of Vw1_act_y estimated from the detection value of the rotational speed of the electric motor 8b).

Also, in this case, in the processing unit 41, the range Δa (the magnitude of the upper limit value and the lower limit value of the range Δa) of a value of an input parameter making the output value of the processing unit 41 zero and the change ratio of the output value with respect to change of a value of the input parameter outside the range Δa are set for each input parameter of each kind in general. This is similar in the processing unit 54 shown in FIG. 11(*b*).

Even when such parameters as described above which substitutes for Vb_estm1_y are used, similarly to the embodiments, the vehicle 1 can be turned according to movement in the right/left direction of the upper body of the occupant.

Here, when the gravity center shift effect amount Vofs_y in the Y-axis direction calculated by the gravity center shift effect amount calculation unit 35*b* of the first control processing unit 24 is used instead of Vb_estm1_y, the Vofs_y is proportionate to the gravity center shift amount estimate value Ofst_estm_y in the Y-axis direction, and therefore, to set the target turning angular velocity ωz_cmd_gc of the vehicle 1 according to Vofs_y is equivalent to set the target turning angular velocity ωz_cmd_gc of the vehicle 1 according to the gravity center shift amount estimate value Ofst_estm_y in the Y-axis direction.

In this case, it can be configured that, even when a transverse movement command may be outputted by the joy stick 12, turning according to it does not occur.

In the respective embodiments, the distance L3 between the center of turning and the grounding part of the first moving motion unit 3 when the vehicle 1 turned was changed according to the estimate value (observed value) Vb_estm_x of the moving speed in the front/rear direction of the vehicle system center of gravity of the entirety. However, L3 may be a constant value determined beforehand.

Further, in the first embodiment, the target turning angular velocity ωz_cmd_gc was set to zero when the estimate value Vb_estm1_y of the moving speed in the Y-axis direction of the vehicle system center of gravity of the entirety as the input parameter of the processing unit 41 was a value within a predetermined range Δa in the vicinity of zero. However, even when the input parameter is a value within the predetermined range Δa, the target turning angular velocity ωz_cmd_gc may be set so as to turn the vehicle 1. That is, Δa may be made zero.

Also, in the respective embodiments, the second moving motion unit 4 disposed on the rear side of the first moving motion unit 3 was shown. However, the second moving motion unit 4 may be disposed on the front side of the first moving motion unit 3 for example.

Also, in the respective embodiments, the control device 21 may be configured so as to lower the steering sensitivity of the vehicle 1 in the warming up period from the start of the vehicle 1 until a constant time elapses compared to that in the normal operation period thereafter. In order to lower the steering sensitivity of the vehicle 1, for example, the dead zone of the processing unit 32*c* (refer to FIG. 5) of the gravity center target speed determination unit 32 forming the first control processing unit 24 is widened temporarily in the warming up period. Thus, the situation that the vehicle 1 starts to move in the warming up period can be avoided.

The control device 21 may be configured so as to lower the steering sensitivity of the vehicle 1 intermittently or continuously when abnormality is detected in the vehicle 1. Thus, such situation is avoided that the damage increases because the vehicle 1 is still used continuously even if abnormality occurs in the vehicle 1. The control device 21 may be configured so as to display presence/absence of abnormality detection or the kind of abnormality on the indicator or to make a speaker output the same by sound.

As the abnormality, a system error such as noise-originated communication abnormality of the control device 21, significant drop of the storage quantity of the on-vehicle battery, overheating of a constituting component of the vehicle 1, excessive supply current to electric equipment that is a constituting component of the vehicle 1, and the like can be cited.

In order to lower the steering sensitivity of the vehicle 1, for example, at least one of a limit value in the X-axis direction and the Y-axis direction of the processing unit 32*e* of the gravity center target speed determination unit 32 (refer to FIG. 5) forming the first control processing unit 24 and a limit value in the Y-axis direction of the processing unit 41 (refer to FIG. 9) forming the second control processing unit 25 is adjusted so as to gradually approach 0 after abnormality detection.

The control device 21 may be configured so as to raise the steering sensitivity of the vehicle 1 so as to approach the initial steering sensitivity according to state change after abnormality detection of the vehicle 1. Thus, movement of the vehicle 1 to the maintenance location and the like after occurrence of abnormality becomes possible or easy.

For example, when the event that the user gets down from the occupant riding section 5 is detected after a drop in the storage quantity of the battery is detected, the steering sensitivity of the vehicle 1 may be raised. When the event that the temperature of a constituting component of the vehicle 1 has dropped to a normal temperature is confirmed after overheat of the constituting component is detected, the steering sensitivity of the vehicle 1 may be raised. When the event that the supply current to a constituting component of the vehicle 1 has been restored to a normal value is confirmed after excessive supply current to the constituting component of the vehicle 1 is detected, the steering sensitivity of the vehicle 1 may be raised.

In the respective embodiments, the joy stick 12 was used as an operation tool for outputting the advancing/retreating command and the transverse moving command, however, a track ball and a touch pad may be used instead of the joy stick, or otherwise, a load sensor detecting the contact position by the occupant, an attitude sensor held by the occupant, and the like may be used. Also, a portable terminal such as a smart phone for example can be used as the operation tool.

Further, the operation tool such as the joy stick 12 and the like may be omitted, or otherwise, an operation tool that outputs only the advancing/retreating command may be provided.

Also, the second moving motion unit 4 may have a structure other than the omni-wheel, or may have a structure similar to that of the first moving motion unit 3 for example.

Also, it may be configured to be capable of selecting to turn the vehicle 1 by that the occupant moves the body of the occupant himself or herself in the right/left direction by operation of a selection switch and the like by the occupant, and to turn the vehicle 1 by operation of an operation tool such as a joy stick by the occupant.

Further, it may be configured that, when the vehicle 1 is turned according to the operation of an operation tool such as a joy stick and the like, the target turning angular velocity in the turning motion of the vehicle 1, or the moving speed in the Y-axis direction or the turning radius and the like of the first moving motion unit 3 can be designated in the control device 21 by operation of the operation tool.

Also, in the embodiment, the brake device 18 including the brake disk 81 was exemplified. However, the brake device 18 may have another configuration as far as the second moving motion unit 4 can be braked. For example, the brake device 18 may be formed of a drum brake or such a brake as used in a bicycle and the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An inverted pendulum vehicle comprising:
a first moving motion unit configured to be capable of moving in all directions on a floor surface;
an actuator device for driving the first moving motion unit;
a base that incorporates the first moving motion unit and the actuator device;
an occupant riding section incorporated into the base so as to be tiltable with respect to the vertical direction;
a tilting state detection unit for detecting the tilting state of the occupant riding section; and
a first control unit configured to control the motion of the actuator device according to a detection result of the tilting state of the occupant riding section at least by the tilting state detection unit;
wherein the inverted pendulum vehicle further includes:
a second moving motion unit disposed with an interval from the first moving motion unit and configured to be capable of moving in all directions on a floor surface;
a brake device configured to be capable of generating a braking force imparted to the second moving motion unit; and
a second control unit that determines presence/absence of a request for turning motion of the inverted pendulum vehicle, and when there is a request for the turning motion, controls a motion of the brake device so as to impart the braking force to the second moving motion unit.

2. The inverted pendulum vehicle according to claim 1, wherein the second moving motion unit is disposed with the interval from the first moving motion unit in the front/rear direction of an occupant riding on the occupant riding section; and
the brake device is configured to be capable of generating a brake force braking movement of the second moving motion unit toward the right/left direction out of the front/rear direction and the right/left direction of the occupant.

3. The inverted pendulum vehicle according to claim 2, wherein the second moving motion unit is disposed behind the first moving motion unit in the front/rear direction of the occupant riding on the occupant riding section.

4. The inverted pendulum vehicle according to claim 3, wherein the brake device is configured to be capable of variably controlling the magnitude of a brake force imparted to the second moving motion unit by the second control unit.

5. The inverted pendulum vehicle according to claim 3, wherein the brake device is configured to include a brake disk arranged so as to rotate accompanying movement in a predetermined direction of the second moving motion unit, a caliper that sandwiches the brake disk and a brake actuator that drives the caliper.

6. The inverted pendulum vehicle according to claim 2, wherein the brake device is configured to be capable of variably controlling the magnitude of a brake force imparted to the second moving motion unit by the second control unit.

7. The inverted pendulum vehicle according to claim 2, wherein the brake device is configured to include a brake disk arranged so as to rotate accompanying movement in a predetermined direction of the second moving motion unit, a caliper that sandwiches the brake disk and a brake actuator that drives the caliper.

8. The inverted pendulum vehicle according to claim 1, wherein the brake device is configured to include a brake disk arranged so as to rotate accompanying movement in a predetermined direction of the second moving motion unit, a caliper that sandwiches the brake disk and a brake actuator that drives the caliper.

9. The inverted pendulum vehicle according to claim 1, wherein the brake device is configured to be capable of variably controlling the magnitude of a brake force imparted to the second moving motion unit by the second control unit.

10. The inverted pendulum vehicle according to claim 9, wherein the second control unit is configured, when there is a request for the turning motion, to set a target turning angular velocity of the inverted pendulum vehicle, and to control the magnitude of the brake force generated by the brake device according to the target turning angular velocity.

11. An inverted pendulum vehicle comprising:
a first moving motion unit configured to be capable of moving in all directions on a fixed surface;
an actuator device for driving the first moving motion unit;
a riding section incorporated into the base so as to be tiltable with respect to the vertical direction;
a tilting state detection unit for detecting the tilting state of the riding section; and
a first control unit configured to control the motion of the actuator device according to a detection result of the tilting state of the riding section at least by the tilting state detection unit;
wherein the inverted pendulum vehicle further includes:
a second moving motion unit disposed a predetermined interval from the first moving motion unit and configured to be capable of moving in all directions on the fixed surface;
a brake device configured to be capable of generating a braking force imparted to the second moving motion unit; and
a second control unit for determining a presence/absence of a request for turning motion of the inverted pendulum vehicle, and upon a request for the turning motion, controls the brake device for imparting the braking force to the second moving motion unit.

12. The inverted pendulum vehicle according to claim 11, wherein the second moving motion unit is disposed the predetermined interval from the first moving motion unit in the front/rear direction of an occupant riding on the riding section; and
the brake device is configured to be capable of generating a brake force braking movement of the second moving motion unit toward the right/left direction out of the front/rear direction and the right/left direction of the occupant.

13. The inverted pendulum vehicle according to claim 12, wherein the second moving motion unit is disposed behind the first moving motion unit in the front/rear direction of the occupant riding on the occupant riding section.

14. The inverted pendulum vehicle according to claim 13, wherein the brake device is configured to be capable of variably controlling the magnitude of a brake force imparted to the second moving motion unit by the second control unit.

15. The inverted pendulum vehicle according to claim 13, wherein the brake device is configured to include a brake disk arranged so as to rotate accompanying movement in a predetermined direction of the second moving motion unit, a caliper that sandwiches the brake disk and a brake actuator that drives the caliper.

16. The inverted pendulum vehicle according to claim 12, wherein the brake device is configured to be capable of variably controlling the magnitude of a brake force imparted to the second moving motion unit by the second control unit.

17. The inverted pendulum vehicle according to claim 12, wherein the brake device is configured to include a brake disk arranged so as to rotate accompanying movement in a predetermined direction of the second moving motion unit, a caliper that sandwiches the brake disk and a brake actuator that drives the caliper.

18. The inverted pendulum vehicle according to claim 11, wherein the brake device is configured to include a brake disk arranged so as to rotate accompanying movement in a predetermined direction of the second moving motion unit, a caliper that sandwiches the brake disk and a brake actuator that drives the caliper.

19. The inverted pendulum vehicle according to claim 11, wherein the brake device is configured to be capable of variably controlling the magnitude of a brake force imparted to the second moving motion unit by the second control unit.

20. The inverted pendulum vehicle according to claim 19, wherein the second control unit is configured, when there is a request for the turning motion, to set a target turning angular velocity of the inverted pendulum vehicle, and to control the magnitude of the brake force generated by the brake device according to the target turning angular velocity.

* * * * *